US011336107B2

(12) United States Patent
Mizukami et al.

(10) Patent No.: US 11,336,107 B2
(45) Date of Patent: May 17, 2022

(54) INFORMATION PROCESSING DEVICE, INFORMATION PROCESSING SYSTEM, AND CHARGING METHOD

(71) Applicant: SONY CORPORATION, Tokyo (JP)

(72) Inventors: Tomoo Mizukami, Tokyo (JP); Atsuo Suzuki, Tokyo (JP); Yuumi Ozawa, Tokyo (JP); Ryo Nakagawa, Kanagawa (JP); Shota Kawarazaki, Kanagawa (JP); Masahiko Naito, Tokyo (JP); Kazuyuki Saga, Kanagawa (JP); Naoyuki Itakura, Kanagawa (JP); Tomohiko Sato, Kanagawa (JP); Masashi Kokubo, Kanagawa (JP); Daisuke Sakai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 47 days.

(21) Appl. No.: 16/314,667

(22) PCT Filed: Apr. 3, 2017

(86) PCT No.: PCT/JP2017/013969
§ 371 (c)(1),
(2) Date: Jan. 1, 2019

(87) PCT Pub. No.: WO2018/012055
PCT Pub. Date: Jan. 18, 2018

(65) Prior Publication Data
US 2019/0334354 A1 Oct. 31, 2019

(30) Foreign Application Priority Data

Jul. 13, 2016 (JP) .............................. JP2016-138673

(51) Int. Cl.
H02J 7/00 (2006.01)
G06N 5/04 (2006.01)
(Continued)

(52) U.S. Cl.
CPC ................ *H02J 7/007* (2013.01); *G06N 5/04* (2013.01); *H01M 10/44* (2013.01); *H01M 10/48* (2013.01);
(Continued)

(58) Field of Classification Search
CPC ......... H02J 7/007; H02J 7/0071; H02J 7/0048
See application file for complete search history.

(56) References Cited

U.S. PATENT DOCUMENTS 5,736,834 A * 4/1998 Kuno .................... H02J 7/0071
320/146
5,814,108 A * 9/1998 Nanamoto .......... H01M 10/345
29/623.1

(Continued)

FOREIGN PATENT DOCUMENTS

JP 2002-142378 A 5/2002
JP 2004-236426 A 8/2004

(Continued)

OTHER PUBLICATIONS

International Search Report dated May 23, 2017 for PCT/JP2017/013969 filed on Apr. 3, 2017, 10 pages including English translation.

*Primary Examiner* — David V Henze-Gongola
*Assistant Examiner* — Tarikh Kanem Rankine
(74) *Attorney, Agent, or Firm* — Xsensus LLP

(57) ABSTRACT

[Object] To achieve both prevention of overcharging of the battery and convenience of the user.
[Solution] An information processing device includes: a charged capacity detection unit configured to detect a charged capacity of a battery; a charging control unit configured to control a charging circuit; and a specification unit configured to specify when discharge of the battery starts. The charging control unit performs charging suppression control on the charging circuit such that the battery is (Continued)

charged to a preparatorily charged capacity that is lower than a fully charged capacity of the battery, on the basis of the charged capacity detected by the charged capacity detection unit, the charging of the battery stops when the charged capacity of the battery reaches the preparatorily charged capacity, and the charging of the battery restarts from the preparatorily charged capacity before discharge of the battery starts.

17 Claims, 18 Drawing Sheets

(51) Int. Cl.
    *H01M 10/44*     (2006.01)
    *H01M 10/48*     (2006.01)
    *H01M 10/0525*     (2010.01)

(52) U.S. Cl.
    CPC ....... *H02J 7/0047* (2013.01); *H01M 10/0525* (2013.01); *H02J 7/00036* (2020.01); *H02J 7/0044* (2013.01); *H02J 7/007182* (2020.01)

(56) References Cited

U.S. PATENT DOCUMENTS

| | | | | |
|---|---|---|---|---|
| 7,782,021 | B2* | 8/2010 | Kelty | H02J 7/0071 320/155 |
| 2005/0024019 | A1* | 2/2005 | Matsumoto | H02J 7/0031 320/132 |
| 2005/0248314 | A1* | 11/2005 | James | H01M 10/44 320/131 |
| 2006/0226807 | A1* | 10/2006 | Simpson | H02J 7/0069 320/110 |
| 2008/0281473 | A1* | 11/2008 | Pitt | G06Q 50/06 700/291 |
| 2009/0289603 | A1* | 11/2009 | Mahowald | H02J 7/008 320/151 |
| 2010/0123436 | A1* | 5/2010 | Herrod | H02J 7/00 320/132 |
| 2010/0219769 | A1* | 9/2010 | Matsumura | A61B 5/15113 315/291 |
| 2011/0018679 | A1* | 1/2011 | Davis | H02J 50/12 340/3.1 |
| 2011/0175576 | A1* | 7/2011 | Uesaka | H02J 7/0044 320/155 |
| 2011/0285356 | A1* | 11/2011 | Maluf | G01R 31/36 320/139 |
| 2012/0249088 | A1* | 10/2012 | Abe | B60L 53/63 320/164 |
| 2012/0290506 | A1* | 11/2012 | Muramatsu | G01C 21/3476 705/412 |
| 2013/0285608 | A1* | 10/2013 | Jikihara | B60L 58/15 320/109 |
| 2014/0099614 | A1* | 4/2014 | Hu | G09B 19/00 434/236 |
| 2014/0225573 | A1* | 8/2014 | Watanabe | H02J 7/007 320/155 |
| 2016/0380440 | A1* | 12/2016 | Coleman, Jr | H02J 7/00711 700/295 |
| 2017/0163046 | A1* | 6/2017 | Patil | H02J 7/00 |

FOREIGN PATENT DOCUMENTS

| | | |
|---|---|---|
| JP | 2013-31232 A | 2/2013 |
| JP | 2014-176104 A | 9/2014 |
| JP | 2014-176260 A | 9/2014 |
| JP | 2015-104139 A | 6/2015 |
| WO | 2012/093638 A1 | 7/2012 |
| WO | 2016/052100 A1 | 4/2016 |

* cited by examiner

INFORMATION PROCESSING DEVICE, INFORMATION PROCESSING SYSTEM, AND CHARGING METHOD

CROSS-REFERENCE TO RELATED APPLICATIONS

This application is a National Stage Application based on PCT/JP2017/013969, filed on 3 Apr. 2017, and claims priority to Japanese Patent Application No. 2016-138673, filed on 13 Jul. 2016, the entire contents of which being incorporated herein by reference.

TECHNICAL FIELD

The present disclosure relates to an information processing device, an information processing system, and a charging method.

BACKGROUND ART

It is known that, with regard to an information processing device including a chargeable battery, the performance of the battery deteriorates when the battery is maintained with a highly charged capacity (in an overcharged state). A charging control method for preventing the battery from being maintained in the overcharged state for a long time has been discussed.

Patent Literature 1 discloses a battery charge/discharge control device that controls the charged capacity of a battery such that the battery is not maintained in the overcharged state. The battery charge/discharge control device disclosed by Patent Literature 1 determines connection to a charger and the charged capacity of the battery. In addition, the battery charge/discharge control device disclosed by Patent Literature 1 decides whether or not to charge the battery in accordance with determination results.

CITATION LIST

Patent Literature

Patent Literature 1: JP 2004-236426A

DISCLOSURE OF INVENTION

Technical Problem

The battery charge/discharge control device disclosed in the above-listed Patent Literature 1 is designed in view of overcharging of the battery, but is not designed in view of convenience of users. In other words, the battery of the battery charge/discharge control device disclosed by Patent Literature 1 is kept with a low charged capacity. Therefore, the battery is not sufficiently charged when the user wants to use the device. Accordingly, the present disclosure proposes an information processing device designed in view of both prevention of overcharging of the battery and convenience of the user.

Solution to Problem

According to the present disclosure, there is provided an information processing device including: a charged capacity detection unit configured to detect a charged capacity of a battery; a charging control unit configured to control a charging circuit; and a specification unit configured to specify when discharge of the battery starts. The charging control unit performs charging suppression control on the charging circuit such that the battery is charged to a preparatorily charged capacity that is lower than a fully charged capacity of the battery, on the basis of the charged capacity detected by the charged capacity detection unit, the charging of the battery stops when the charged capacity of the battery reaches the preparatorily charged capacity, and the charging of the battery restarts from the preparatorily charged capacity before discharge of the battery starts.

In addition, according to the present disclosure, there is provided an information processing system including: a charged capacity detection unit configured to detect a charged capacity of a battery; a charging control unit configured to control a charging circuit; and a specification unit configured to specify when discharge of the battery starts. The charging control unit performs charging suppression control on the charging circuit such that the battery is charged to a preparatorily charged capacity that is lower than a fully charged capacity of the battery, on the basis of the charged capacity detected by the charged capacity detection unit, the charging of the battery stops when the charged capacity of the battery reaches the preparatorily charged capacity, and the charging of the battery restarts from the preparatorily charged capacity before discharge of the battery starts.

In addition, according to the present disclosure, there is provided a charging method including: detecting a charged capacity of a battery; specifying when discharge of the battery starts; charging the battery to a preparatorily charged capacity that is lower than a fully charged capacity of the battery, on the basis of the detected charged capacity of the battery; stopping the charging of the battery when the charged capacity of the battery reaches the preparatorily charged capacity; and performing charging suppression control on a charging circuit such that the charging of the battery restarts from the preparatorily charged capacity before discharge of the battery starts.

Advantageous Effects of Invention

As described above, according to the present disclosure, it is possible to provide a battery charging method that suppresses overcharging of a battery and that is convenient for users.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. Note that, in this specification and the appended drawings, structural elements that have substantially the same function and structure are denoted with the same reference signs, and repeated explanation of these structural elements is omitted.

Note that the description is given in the following order.
1. Configuration of information processing device
1-1. Appearance of information processing device
1-2. Internal configuration of information processing device
2. Process example of charging suppression control
2-1. Charging method under charging suppression control
2-2. Prediction method of chargeable time period
2-3. Operation of respective units under charging suppression control
2-4. Charging suppression control in which charging is carried out in stages
2-5. Cancellation of charging suppression control
2-6. Process example in case where charger is disconnected
2-7. Charging suppression control using accuracy
3. Charging suppression control using information from application
4. Charging suppression control based on information from another information
processing device
5. Supplement
6. Conclusion 1. Configuration of Information Processing Device <1-1. Appearance of Information Processing Device>

Figure 1:
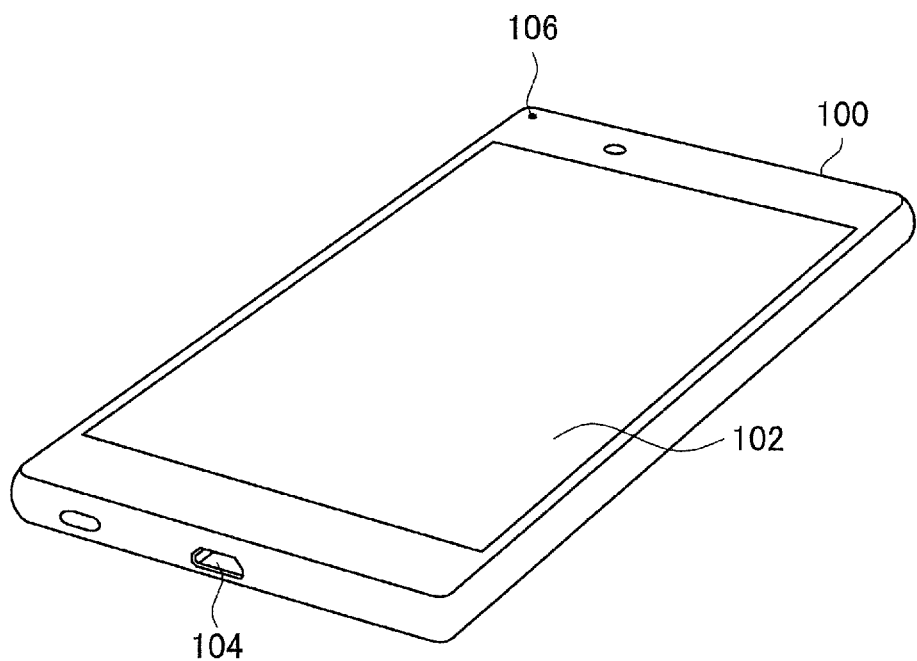
FIG. 1 is a diagram illustrating an example of appearance of an information processing device according to an embodiment of the present disclosure.

FIG. 1 is a diagram illustrating appearance of a mobile phone 100 that is an example of an information processing device according to an embodiment of the present disclosure. The mobile phone 100 according to the embodiment of the present disclosure includes a speaker and a microphone. The mobile phone 100 is capable of communicating with another terminal by communicating with a base station included in a mobile communication network. In addition, the mobile phone 100 includes a display unit 102 configured to display information, and a touchscreen provided on the display unit 102. A user performs operations related to various functions or applications of the mobile phone 100 by performing the operations via the touchscreen.

In addition, the mobile phone 100 includes a charging terminal 104 such as a Universal Serial Bus (USB) terminal. A charger is connected to the charging terminal 104. A battery included in the mobile phone 100 is charged when the charger is connected to the charging terminal 104. Note that, the charger is not limited to the USB terminal. The charger may be a charger dedicated to the mobile phone 100.

In addition, the mobile phone 100 includes a light emitting unit 106 that indicates a state of the mobile phone 100. For example, the light emitting unit 106 emits light for indicating that the battery is being charged, while the battery of the mobile phone 100 is being charged. Note that, the information processing device to which the charging control according to the present disclosure is applied is not limited to the mobile phone 100 as long as the information processing device is a device that controls charging of a chargeable battery. For example, the information processing device may be a personal computer, a digital camera, or a wearable terminal including the chargeable battery.

<1-2. Internal Configuration of Information Processing Device>

Figure 2:
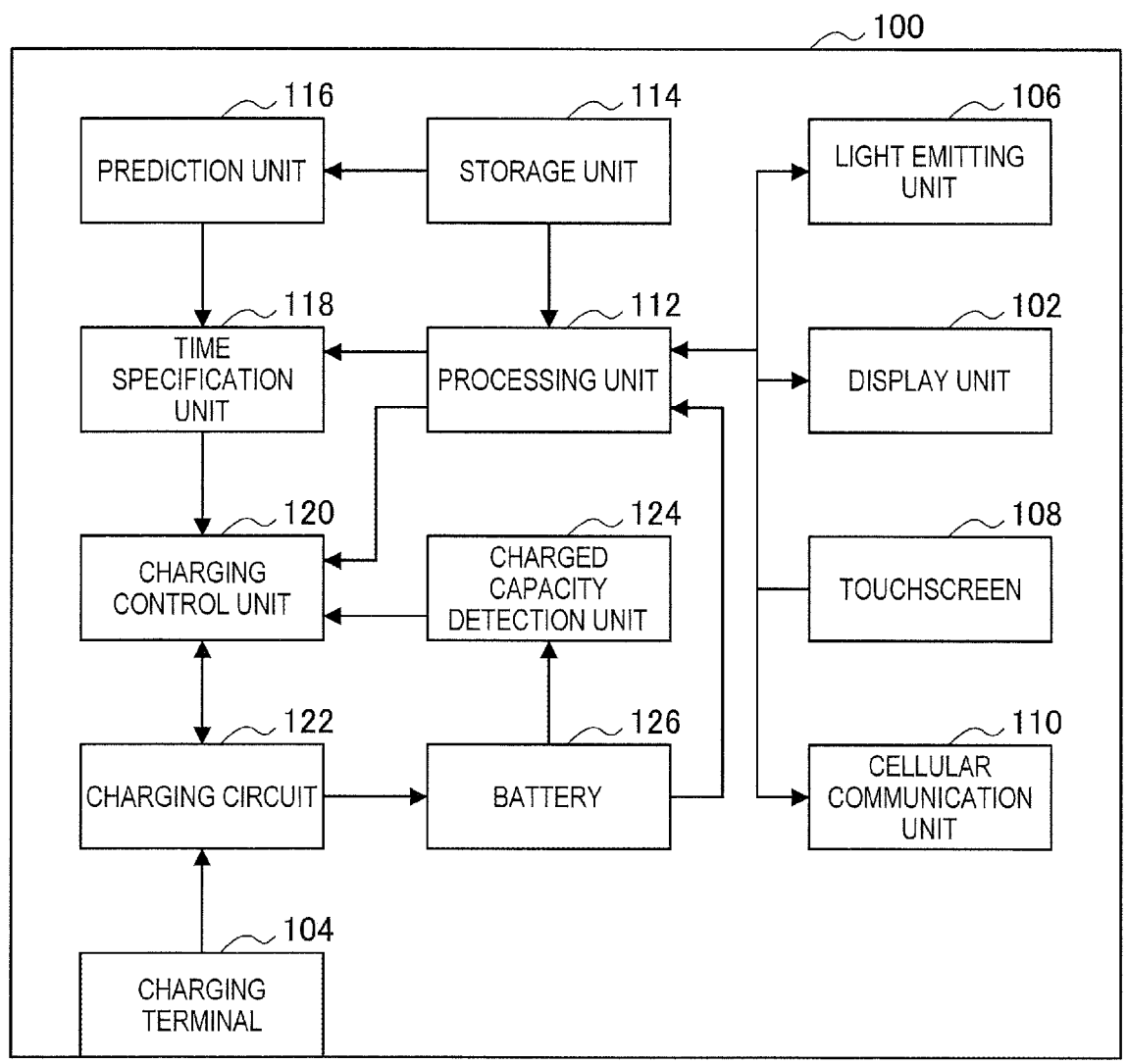
FIG. 2 is a block diagram illustrating an example of a configuration of the information processing device according to the embodiment of the present disclosure.

The appearance of the mobile phone 100 according to the embodiment of the present disclosure has been described above. Next, an internal configuration of the mobile phone 100 according to the embodiment of the present disclosure will be described. FIG. 2 is a block diagram illustrating the configuration of the mobile phone 100. The mobile phone 100 according to the embodiment of the present disclosure includes a cellular communication unit 110 in addition to the display unit 102, the light emitting unit 106, and the touchscreen 108 that have been described above.

As described above, the display unit 102 displays information related to functions of the mobile phone 100 and applications executed by the mobile phone 100. Note that, the display unit 102 may be a liquid crystal display or an organic electro-luminescence (EL) display.

The touchscreen 108 is used by the user to operate the functions and applications of the mobile phone 100. The touchscreen 108 may be externally attached on the liquid crystal display or the organic EL display, or may be integrated with the liquid crystal display or the organic EL display.

In addition, the light emitting unit 106 is used for showing a state of the mobile phone 100. For example, the light emitting unit 106 may emit light in different colors in accordance with states of the mobile phone 100. Note that, the light emitting unit 106 may include a light emitting diode (LED).

The cellular communication unit 110 is used for communicating with other devices. For example, the mobile phone 100 is connected to a mobile phone network, the Internet, or the like when the cellular communication unit 110 communicates with a base station of a mobile network. Note that, the cellular communication unit 110 may be a wireless communication interface designed by the 3GPP such as Long-Term Evolution (LTE).

In addition, the mobile phone 100 includes a processing unit 112, a storage unit 114, a prediction unit 116, and a time specification unit 118. The processing unit 112 is connected to respective units of the mobile phone 100 and executes various processes. For example, the processing unit 112 executes the functions and applications of the mobile phone 100. Examples of the functions and applications of the mobile phone 100 include e-mail, short message, a social networking service, photography, music reproduction, a browsing function, map display, an alarm clock function, a calendar function, and the like. In addition, the processing unit 112 generates information to be displayed on the display unit 102, and processes signals from the touchscreen 108.

The storage unit 114 stores various kinds of data. For example, the storage unit 114 stores information related to an operating system (OS) used by the mobile phone 100, data used by the prediction unit 116, information related to the applications executed by the mobile phone 100, and the like. The prediction unit 116 predicts a chargeable time period from a time when a charger is connected to the mobile phone 100 to a time when discharge from the battery 126 will start. The time specification unit 118 specifies a time (timing) when the discharge from the battery 126 will start, on the basis of the chargeable time period predicted by the prediction unit 116. A method for predicting the chargeable time period will be described later.

In addition, the mobile phone 100 includes a charging control unit 120, a charging circuit 122, a charged capacity detection unit 124, and the battery 126. The charging control unit 120 performs charging suppression control (to be described later) on the charging circuit 122 on the basis of a discharge starting time specified by the time specification unit 118, the charged capacity of the battery 126 detected by the charged capacity detection unit 124, and the like. Note that, the charged capacity detection unit 124 may determine the charged capacity of the battery 126 by detecting a voltage and a current of the battery 126, or may determine the charged capacity of the battery 126 by measuring inflowing and outflowing currents of the battery 126.

The charging circuit 122 switches electric power feeding paths under the control of the charging control unit 120. In other words, when the electric power feeding path is set on the battery side under the control of the charging control unit 120, the charging circuit 122 charges the battery 126. When the electric power feeding path to the battery 126 is disconnected, charging of the battery 126 stops. In addition, when the electric power feeding path is set on the charging control unit 120 side, the charging circuit 122 feeds electric power from the charging terminal 104 to the respective units of the mobile phone 100 without passing through the battery 126.

2. Process Example of Charging Suppression Control

<2-1. Charging Method Under Charging Suppression Control>

Figure 3:
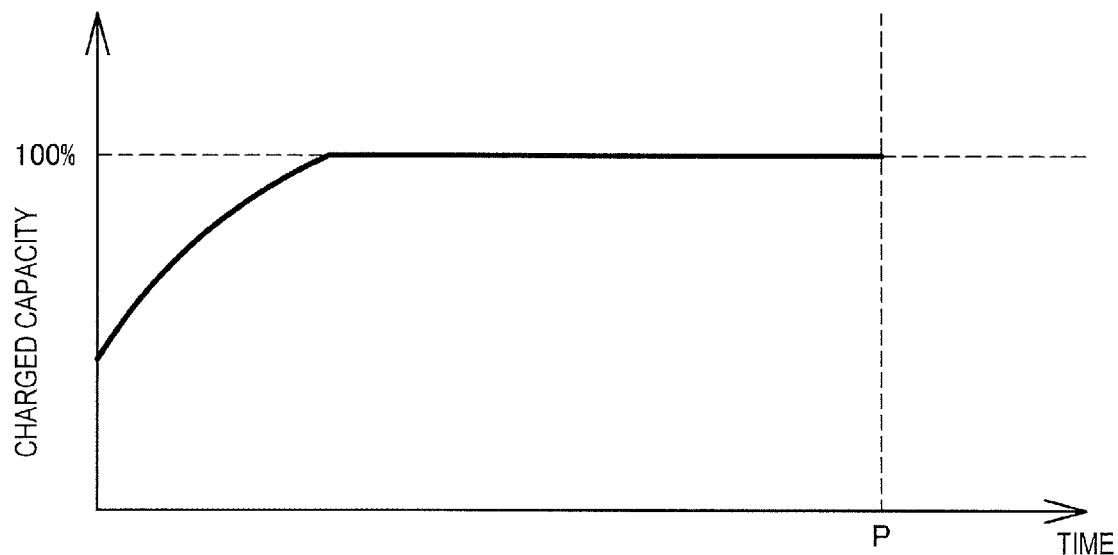
FIG. 3 is a diagram illustrating an example of a conventional charging method.

The structural elements of the mobile phone 100 that is an example of the information processing device according to the present embodiment have been described above. Next, a process example of charging suppression control performed by the information processing device according to the present embodiment will be described. FIG. 3 is a diagram illustrating a standard charging method that is compared with the charging suppression control according to the present disclosure.

As illustrated in FIG. 3, in the standard charging method, the battery 126 is continuously charged until the battery 126 is fully charged (100%) when a charger is connected to the charging terminal 104 of the mobile phone 100. Therefore, in the standard charging method, the battery 126 is maintained with a highly charged capacity for a long time until a time point P at which a user starts using the mobile phone 100 as illustrated in FIG. 3 (in other words, until a time point at which the charger is disconnected from the charging terminal 104 of the mobile phone 100) after the battery 126 is fully charged. As described above, such a situation is called the overcharged state in general. The performance of the battery 126 deteriorates when the overcharged state is continued.

Figure 4:
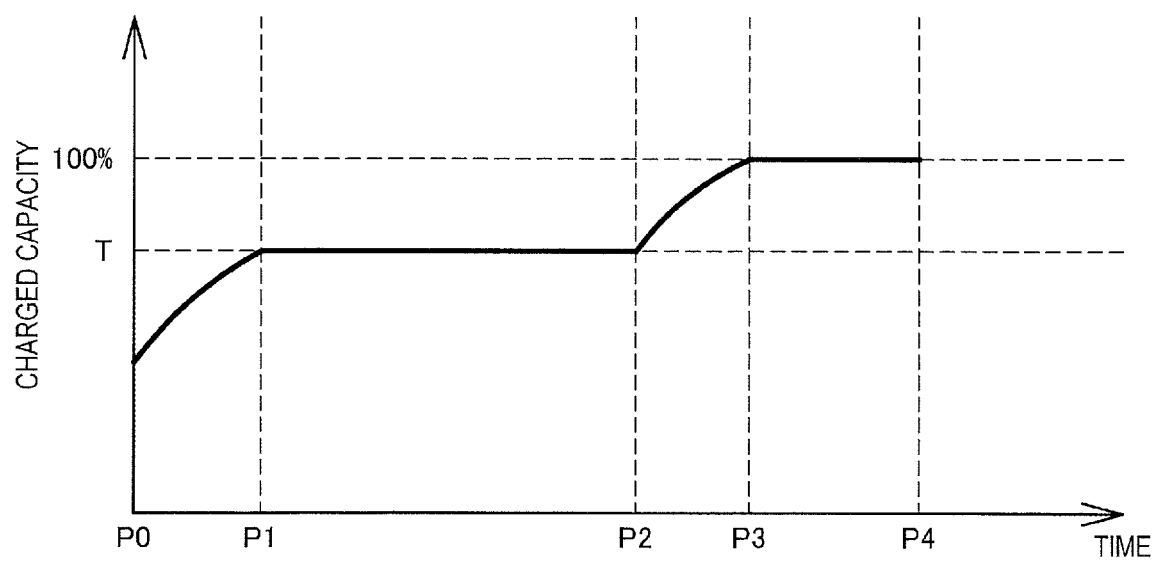
FIG. 4 is a diagram illustrating an example of charging suppression control performed by the information processing device according to the embodiment of the present disclosure.

In view of the above-described problem, the information processing device according to the present disclosure performs charging suppression control as illustrated in FIG. 4. Under the charging suppression control according to the present disclosure, it is possible to specify a time point P4 at which the charger is disconnected from the charging terminal 104 of the mobile phone 100 when the charger is connected to the charging terminal 104 of the mobile phone 100 at a time point P0.

The battery 126 is charged from an initial value to a preparatorily charged capacity T that is a predetermined charged capacity (such as 90% of a fully charged capacity). Next, when the charging of the battery 126 to the preparatorily charged capacity is completed, the charging of the battery 126 is stopped. At this time, the charging control unit 120 controls the charging circuit 122 such that the electric power feeding path to the battery 126 is disconnected. Accordingly, electric power from the charger is directly fed to the respective units of the mobile phone 100 via the charging control unit 120.

Next, the charged capacity of the battery 126 is maintained at the preparatorily charged capacity (threshold T) until a time point P2. The preparatorily charged capacity is a predetermined threshold. The time point P2 is obtained by subtracting a margin and a time it takes to charge the battery 126 from the charged capacity T to the fully charged capacity, from the specified discharge staring time. Next, charging of the battery 126 is restarted at the time point P2. As the time obtained by subtracting the margin and the time it takes to charge the battery 126 from the charged capacity T to the fully charged capacity, a fixed value may be calculated from characteristics of the battery, or the time obtained by subtracting the margin and the time it takes to charge the battery 126 from the charged capacity T to the fully charged capacity may be calculated from a use history of the battery.

When charging of the battery 126 is restarted at P2, the battery 126 is fully charged at a time point P3. Note that, the time period between P3 and P4 is a margin that is set for certainly charging the battery 126 from the preparatorily charged capacity to the fully charged capacity. The margin is set to deal with change in the time it takes to charge the battery 126 from the preparatorily charged capacity to the fully charged capacity due to a state (such as a temperature) of the mobile phone 100. In addition, the time it takes to charge the battery 126 from the preparatorily charged capacity to the fully charged capacity varies depending on charging modes of the battery 126. The charging modes of the battery 126 include a quick charging mode and a mode for charging the battery 126 more gently as the charged capacity of the battery 126 approaches 100%, for example.

As described above, the information processing device according to the present disclosure performs the charging suppression control such that charging of the battery 126 stops at the preparatorily charged capacity and the charging restarts on the basis of the specified discharge staring time. Accordingly, it is possible to shorten a time period in which the battery 126 is maintained in the overcharged state, and it is possible to obtain the battery 126 with the fully charged capacity when the user wants to use the information processing device. Therefore, it is possible to provide the charging method that is convenient for users.

Note that, under the above-described charging suppression control, it may be possible to determine whether or not a time interval between the time point (P0) at which charging starts and the time point (P4) at which the charger is predicted to be discharged from the charging terminal 104 is a predetermined time period or longer. Next, in the case where the chargeable time period between P0 and P4 in which the battery 126 is predicted to be chargeable is the predetermined time period or longer, it is possible to perform the above-described charging control. Accordingly, in the case where the chargeable time period is too short to perform the above-described charging suppression control, the charging suppression control is not performed but standard charging is carried out. Accordingly, by temporarily stopping the charging, it is possible to decrease a possibility that the battery 126 is not fully charged. Details of the chargeable time period will be described later.

<2-2. Prediction Method of Chargeable Time Period>

Figure 5:
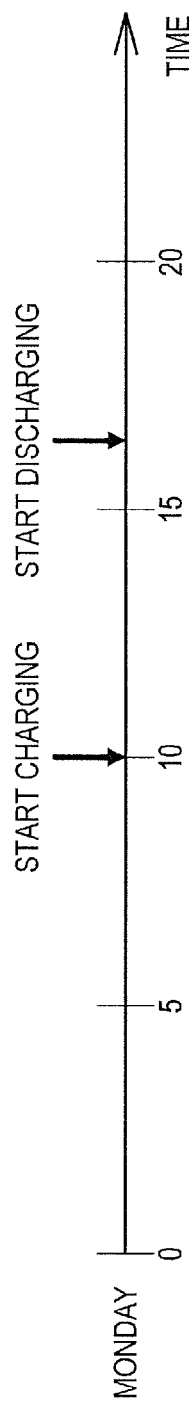
FIG. 5 is a diagram illustrating an example of a time when charging of a mobile phone is started and a time when discharge from the mobile phone is started.

The charging suppression control performed by the information processing device according to the present disclosure has been described above. Next, a prediction method of the chargeable time period that is used in the charging suppression control according to the present disclosure will be described. FIG. 5 is a diagram illustrating an example of a relation between a time when a user starts charging the mobile phone 100 and a time when the user starts using the mobile phone 100. With reference to FIG. 5, the user starts charging the mobile phone 100 at 10 o'clock on Monday, and ends the charging at 16 o'clock. In other words, in FIG. 5, "start charging" means that the user connects a charger to the charging terminal 104 of the mobile phone 100 to charge the mobile phone 100, and "start discharging" means that the user disconnects the charger from the charging terminal 104 of the mobile phone 100 to use the mobile phone 100. The prediction unit 116 predicts the chargeable time period on the basis of charge/discharge time information related to the time when the charger is connected to the charging terminal 104 of the mobile phone 100 and the time when the charger is disconnected from the charging terminal 104 as illustrated in FIG. 5.

Specifically, for example, the prediction unit 116 causes the storage unit 114 to store the charge/discharge time information related to the charge staring time and the discharge starting time illustrated in FIG. 5. Next, on the basis of the stored charge/discharge time information, the prediction unit 116 predicts that discharge from the battery 126 will start at 16 o'clock on Monday, and predicts the chargeable time period on the basis of such information. Note that, the prediction unit 116 causes the storage unit 114 to store the charge/discharge time information for each day of one or more week, and predicts the chargeable time period on the basis of the charge/discharge time information of a corresponding day of the week.

Figure 6:
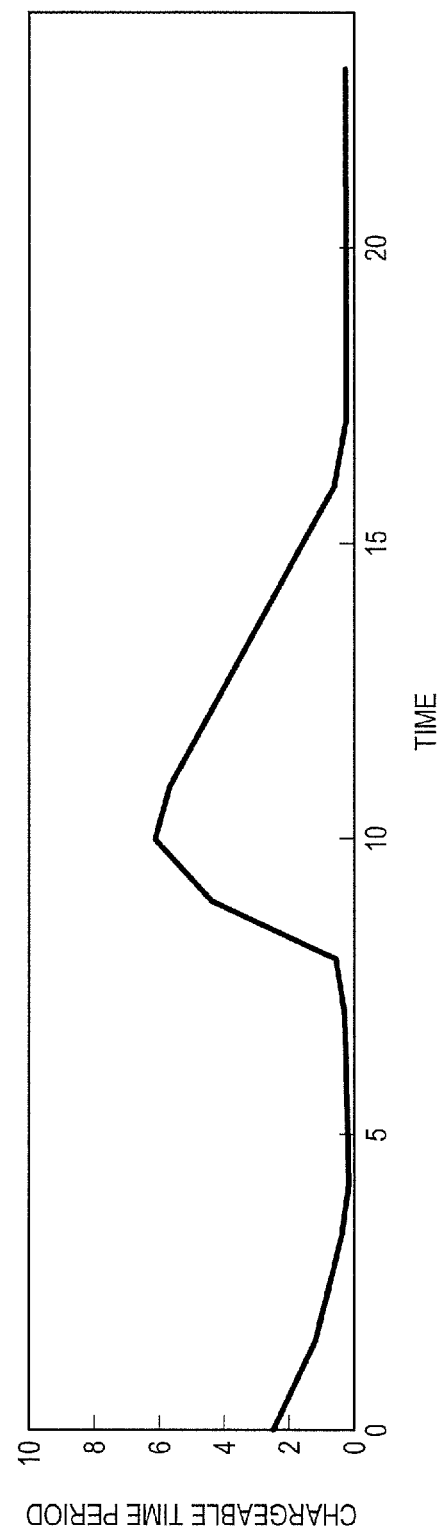
FIG. 6 is a diagram illustrating an example of a chargeable time period predicted by the information processing device according to the embodiment of the present disclosure.

FIG. 6 is a diagram illustrating an example of the chargeable time period that the prediction unit 116 derives. FIG. 6 illustrates how long the charging is possible when charging of the mobile phone 100 is started at respective times represented by a horizontal axis. FIG. 6 illustrates a chargeable time period that the prediction unit 116 derives in the case where charging often starts around 10 o'clock and discharge from the battery 126 often starts around 16 o'clock. As illustrated in FIG. 6, the prediction unit 116 predicts that the chargeable time period is 6 hours when charging starts at 10 o'clock. As illustrated in FIG. 6, the chargeable time period gets shortened as the charge staring time approaches 16 o'clock, at which the battery 126 will start discharge.

Figure 7:
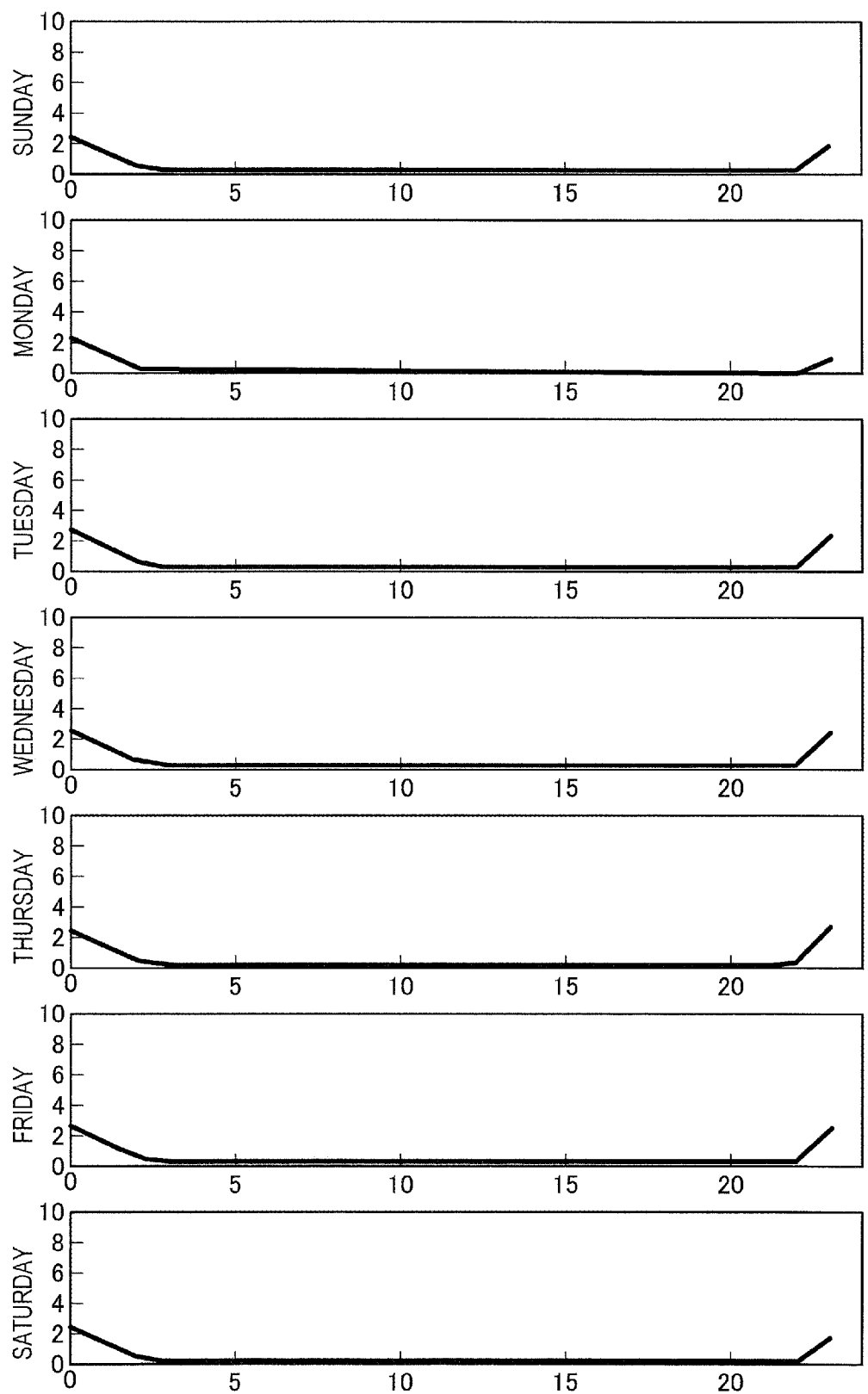
FIG. 7 is a diagram illustrating an example of a process of learning chargeable time periods predicted by the information processing device according to the embodiment of the present disclosure.
Figure 8:
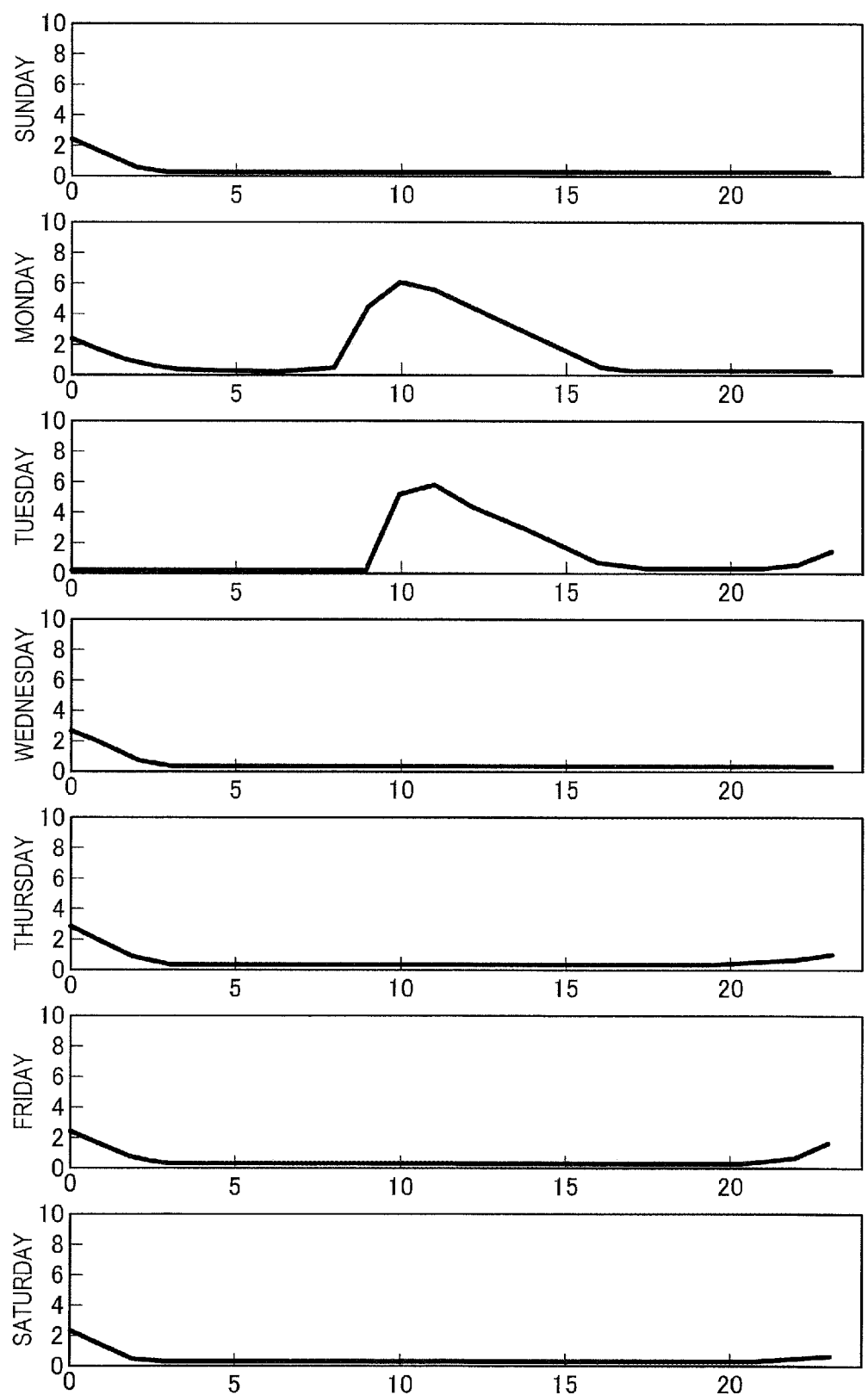
FIG. 8 is a diagram illustrating the example of the process of learning chargeable time periods predicted by the information processing device according to the embodiment of the present disclosure.
Figure 9:
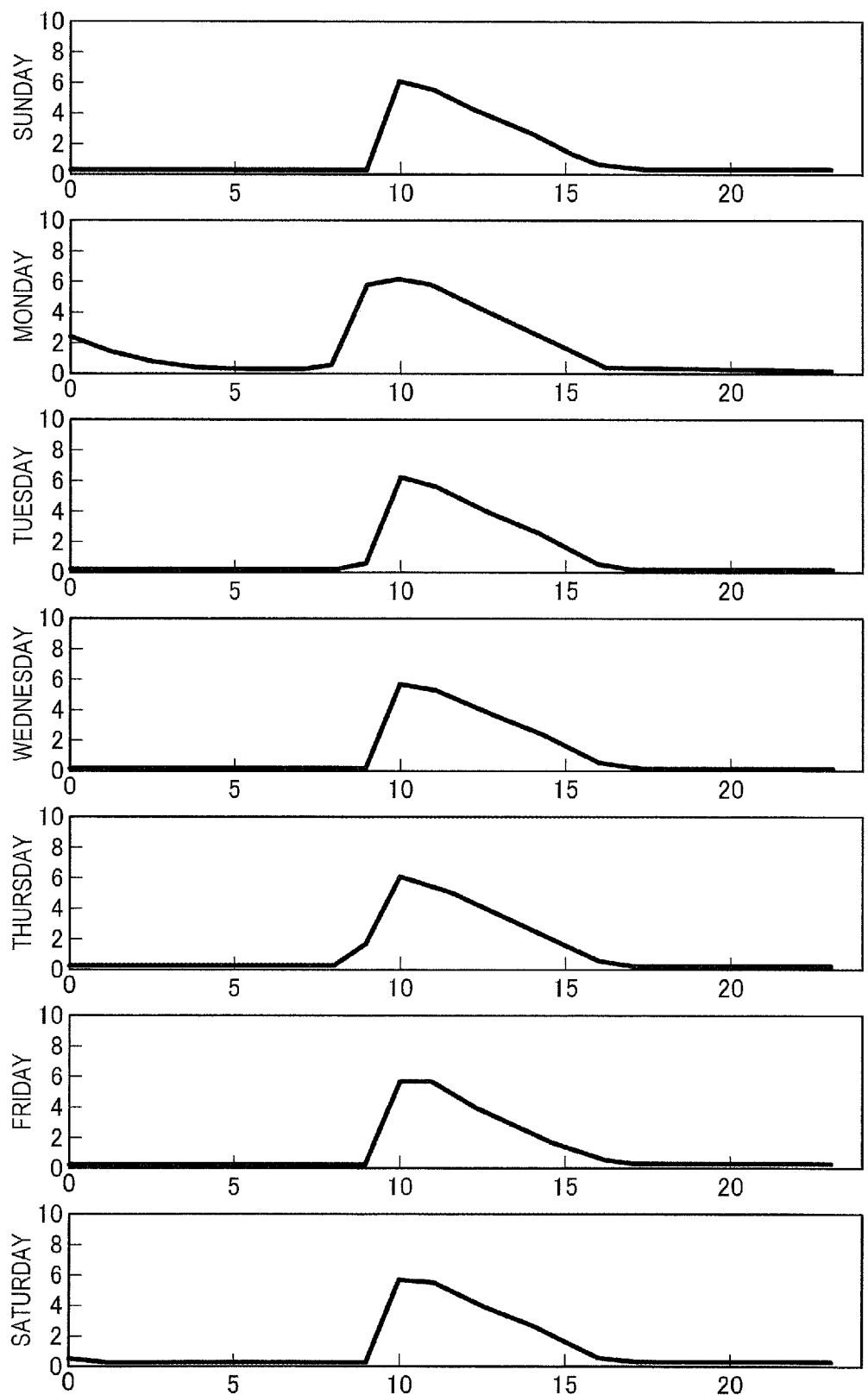
FIG. 9 is a diagram illustrating the example of the process of learning chargeable time periods predicted by the information processing device according to the embodiment of the present disclosure.

FIG. 7 to FIG. 9 are diagrams illustrating a process of learning the chargeable time periods illustrated in FIG. 6. FIG. 7 is a diagram illustrating states on respective days of a week before the learning starts. FIG. 8 is a diagram illustrating data related to chargeable time periods after a lapse of 2 days since the prediction unit 116 has started learning the chargeable time periods. In addition, FIG. 9 is a diagram illustrating data related to chargeable time periods after a lapse of one week since the prediction unit 116 has started learning the chargeable time periods. As illustrated in FIG. 8 and FIG. 9, the prediction unit 116 derives the chargeable time periods for the respective days of the week.

The storage unit 114 stores data related to the chargeable time periods illustrated in FIG. 9. Next, the prediction unit 116 predicts how long the charging is possible on the basis of data related to the times when the charger is connected to the mobile phone 100 and the chargeable time periods stored in the storage unit 114. In addition, as described above, it is possible for the charging control unit 120 to perform the charging suppression control according to the present disclosure in the case where the chargeable time period is a predetermined time period or longer. By using the chargeable time periods as described above, it is possible to prevent the battery 126 from being charged insufficiently because of a too short chargeable time period when the charging suppression control is performed.

In addition, it is also possible for the prediction unit 116 to learn a chargeable time period by using charge/discharge time information for two weeks. This is because recent batteries have large capacities and it is considered that a user charges the battery 126 every two days, for example. In other words, in the case of learning a chargeable time period by using the charge/discharge time information for one week, there may be a date (day of the week) when it is impossible to obtain charge/discharge time information. To prevent such a problem from occurring, for example, it may be possible to learn a chargeable time period by using charge/discharge time information of a corresponding day of a previous week with regard to charge/discharge time information of a date when the charge/discharge time information has not been obtained.

In addition, it is also possible for the prediction unit 116 to learn a chargeable time period by using charge/discharge time information for four weeks. In addition, it is also possible for the prediction unit 116 to differently weight pieces of charge/discharge time information for the different weeks and derive chargeable time periods. For example, the prediction unit 116 may derive the chargeable time periods by multiplying a piece of the charge/discharge time information on four weeks ago last Tuesday by 1, multiplying a piece of the charge/discharge time information on three weeks ago last Tuesday by 2, multiplying a piece of the charge/discharge time information on two weeks ago last Tuesday by 3, and multiplying a piece of the charge/discharge time information on one week ago last Tuesday by 4.

Accordingly, it is possible to derive the chargeable time periods by using a moving average for four weeks. Therefore, it is possible to predict more precise chargeable time periods. In addition, by increasing weighting in the order of proximity of weeks to a current time, it is possible to predict chargeable time periods that reflect recent behavior of a user.

In addition, it is also possible for the prediction unit 116 to learn chargeable time periods by using information related to nonbusiness days stored in the storage unit 114. The behavior of the user often differs between nonbusiness days and business days. For example, it is considered that the user wakes up at different times between nonbusiness days and business days. To predict precise chargeable time periods, it is preferable to use similar information. Therefore, the prediction unit 116 learns a chargeable time period on a nonbusiness day by using charge/discharge time information on nonbusiness days, and learns a chargeable time period on a business day by using charge/discharge time information on business days.

Here, it may be possible to determine whether a date is a nonbusiness day or a business day on the basis of information related to holidays or days of a week (such as Saturday and Sunday) that are set as general nonbusiness days in calendars. In addition, the nonbusiness days are different between users. Therefore, the nonbusiness days may be set by each user. In addition, the nonbusiness days and especially the holidays are different between countries. Therefore, the prediction unit 116 may determine a country by using positional information that has been acquired, and learn chargeable time periods by using information related to holidays in the country. Accordingly, it is possible to predict precise chargeable time periods in accordance with behavior of a user on nonbusiness days or behavior of the user on business days.

<2-3. Operation of Respective Units Under Charging Suppression Control>

The prediction method of the chargeable time period that is used in the charging suppression control according to the present disclosure has been described above. Next, operation of the respective units in a charging suppression control process according to the present disclosure will be described with reference to a flowchart. First, in Step S100 in FIG. 10, charging starts when a charger is connected to the charging terminal 104 of the mobile phone 100.

Next, in Step S102, the prediction unit 116 predicts a chargeable time period and transmits the predicted chargeable time period to the time specification unit 118. Note that, specifically, the prediction unit 116 predicts the chargeable time period by using data related to the chargeable time periods described with reference to FIG. 6 to FIG. 9. The time specification unit 118 receives the predicted chargeable time period from the prediction unit 116 and specifies a discharge starting time by adding the received chargeable time period to a current time.

Next, in Step S104, the charging control unit 120 determines whether or not the chargeable time period is a predetermined time period or more (such as four hours or more) on the basis of the chargeable time period predicted by the prediction unit 116. Here, when the chargeable time period is less than the predetermined time period, the charging control unit 120 controls the charging circuit 122 such that the standard charging is carried out (S108). According to the above-described configuration of the charging control unit 120, it is possible to carry out the standard charging even in the case where the chargeable time period is too short for the charging control unit 120 to perform the charging suppression control.

The process proceeds to Step S106 when the charging control unit 120 determines that the chargeable time period is the predetermined time period or more in Step S104. In Step S106, the charging control unit 120 determines whether or not the charged capacity of the battery 126 reaches a preparatorily charged capacity on the basis of the charged capacity of the battery 126 detected by the charged capacity detection unit 124. When the charged capacity of the battery 126 reaches the preparatorily charged capacity in Step S106, the charging control unit 120 controls the charging circuit 122 such that charging of the battery 126 temporarily stops in Step S110.

Next, the time specification unit 118 determines whether or not the current time is a predetermined period of time (such as 90 minutes) before the discharge starting time. When the time specification unit 118 determines that the current time is the predetermined period of time before the predicted discharge starting time in Step S112, the charging control unit 120 controls the charging circuit 122 such that charging of the battery 126 is restarts in Step S114.

Next, in Step S116, the charging control unit 120 determines whether or not the battery 126 is fully charged on the basis of the charged capacity of the battery 126 detected by the charged capacity detection unit 124. When the charging control unit 120 determines that the battery 126 is fully charged in Step S116, the charging control unit 120 controls the charging circuit 122 such that charging of the battery 126 stops, and the process ends.

Note that, as described above, in Step S112, the time specification unit 118 may specify a time when charging of the battery 126 is to be restarted on the basis of a state of the mobile phone 100. The state of the mobile phone 100 is a state based on a temperature measured by a temperature sensor included in the mobile phone 100, for example. In addition, the time specification unit 118 may specify the time when charging of the battery 126 is to be restarted on the basis of a charging mode of the mobile phone 100. The time specification unit 118 may specify the time when charging of the battery is to be restarted to shorten the margin (the time period between P3 and P4 in FIG. 4) set for certainly charging the battery 126 from the preparatorily charged capacity to the fully charged capacity. The charging modes of the battery 126 include the quick charging mode and the mode for charging the battery 126 more gently as the charged capacity of the battery 126 approaches 100%. In other words, it is possible to shorten a time period in which the battery 126 is maintained in the overcharged state, when the time specification unit 118 changes a time when charging is to be restarted on the basis of the state or the charging mode of the mobile phone 100.

Specifically, the time specification unit 118 lengthens the above-described margin in the case where it takes a long time to charge the battery 126 from the preparatorily charged capacity to the fully charged capacity, in accordance with a state or a charging mode of the mobile phone 100. In addition, the time specification unit 118 shortens the above-described margin in the case where it takes a short time to charge the battery 126 from the preparatorily charged capacity to the fully charged capacity. In addition, the storage unit 114 may store a time it takes to charge the battery 126 from the preparatorily charged capacity to the fully charged capacity and a temperature measured by the temperature sensor of the mobile phone 100 in association with each other. The time specification unit 118 may use such data to specify a time when charging is to be restarted. Therefore, it is possible to set a margin that is appropriate for the mobile phone 100 or an ambient temperature of the mobile phone 100.

Figure 11:
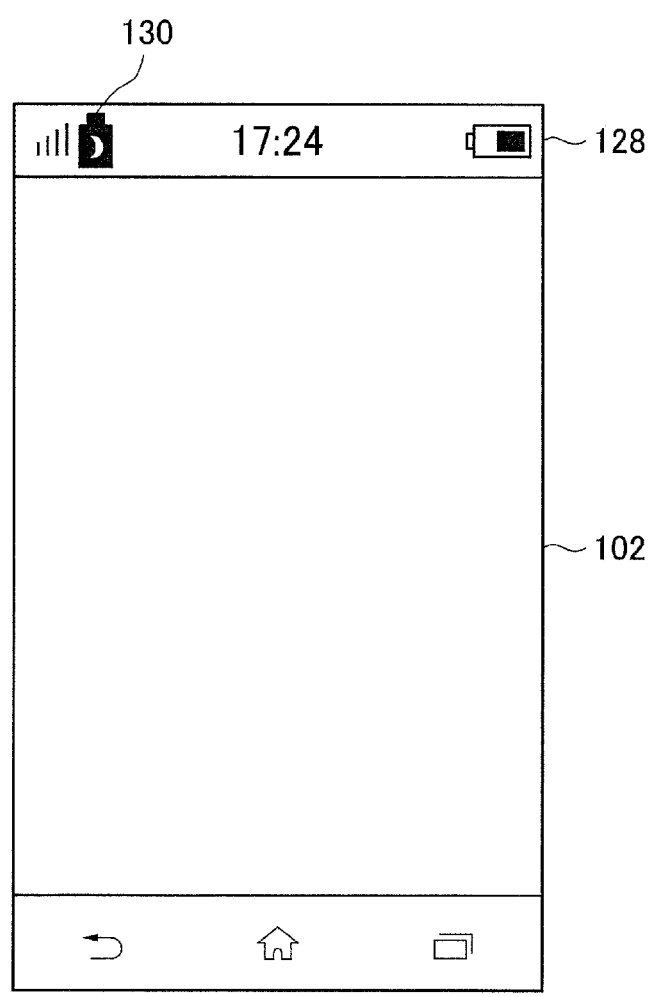
FIG. 11 is a diagram illustrating an example of a display screen displayed by the information processing device according to the embodiment of the present disclosure.

Note that, the processing unit 112 may cause the display unit 102 to display a display indicating that the above-described charging suppression control is being performed. FIG. 11 is a diagram illustrating a charging mode display icon 130 indicating that the charging suppression control is being performed. For example, the charging mode display icon 130 may be displayed in a status bar 128 displayed on the display unit 102. In addition, the display unit 102 may display a dialogue indicating that the charging suppression control is being performed. As described above, by displaying a display indicating that the charging suppression control is being performed, it is possible for a user to easily recognize a charging mode that is currently used.

In addition, it is also possible to use the light emitting unit 106 to indicate that the above-described charging suppression is being performed. Specifically, it is possible for the light emitting unit 106 to change a color of light to be emitted in accordance with a charging mode that is currently set. For example, the light emitting unit 106 may emit light in red in the case of carrying out the standard charging in which the charging suppression control according to the present disclosure is not performed. In addition, the light emitting unit 106 may emit light in greed in the case of carrying out charging under the charging suppression control according to the present disclosure. According to such configurations, it is possible for the user to easily recognize a charging mode even in a state in which the display unit 102 is not lit (such as in a sleep state).

In addition, in the above-described example, the chargeable time period is predicted and the discharge starting time is specified when charging starts. However, it is also possible to predict the chargeable time period and specify the discharge starting time when the charged capacity of the battery 126 reaches the preparatorily charged capacity. In other words, the standard charging is carried out until the battery 126 reaches the preparatorily charged capacity. Subsequently, the chargeable time period may be predicted and the discharge starting time may be specified when the charged capacity of the battery 126 reaches the preparatorily charged capacity.

<2-4. Charging Suppression Control in which Charging is Carried Out in Stages>

Figure 12:
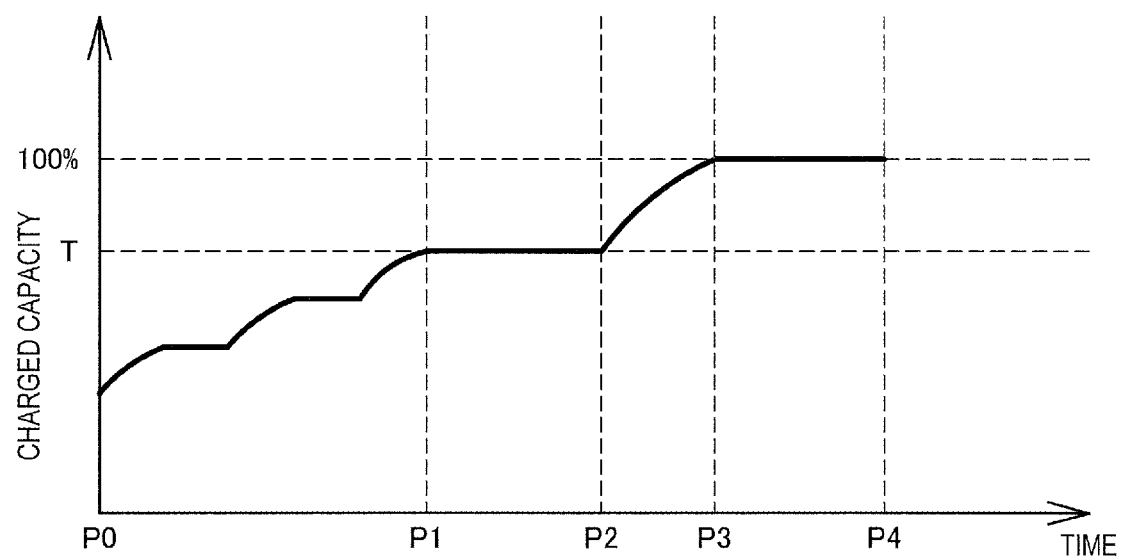
FIG. 12 is a diagram illustrating another example of charging suppression control performed by the information processing device according to the embodiment of the present disclosure.

The example of the charging suppression control according to the present disclosure has been described above. Next, another example of the charging suppression control according to the present disclosure will be described. FIG. 12 is a diagram illustrating another control example of the charging suppression control according to the present disclosure. When FIG. 12 and FIG. 4 are compared, it is understood that processes of charging the battery 126 from an initial value to a preparatorily charged capacity (threshold T) are different between FIG. 12 and FIG. 4. In other words, the battery 126 is continuously charged from the initial value to the preparatorily charged capacity in FIG. 4, while the battery 126 is charged in stages from the initial value to the preparatorily charged capacity in FIG. 12.

Here, the method for charging the battery 126 from the initial value to the preparatorily charged capacity may be a method for repeating start and stop of charging at predetermined time intervals (every hour, for example). Alternatively, the method for charging the battery 126 from the initial value to the preparatorily charged capacity may be a method for repeating start and stop of charging every time the charged capacity reaches predetermined charged capacities. For example, the charging control unit 120 may perform control such that charging stops every time the charged capacity of the battery 126 increases by 10% and charging restarts after a predetermined time period. Specifically, in the case where the initial value of the charged capacity of the battery 126 is 38%, the charging control unit 120 may temporarily stop charging when the charged capacity becomes 48%, 58%, and 68%.

Alternatively, the charging control unit 120 may repeat start and stop of charging every time the battery 126 is charged by a predetermined charged capacity. For example, the charging control unit 120 may perform control such that charging stops every time the battery 126 is charged by 10% and charging restarts after a predetermined time period. Specifically, in the case where the initial value of the charged capacity of the battery 126 is 38%, the charging control unit 120 may temporarily stop charging when the charged capacity becomes 40%, 50%, and 60%.

As described above, the battery 126 is maintained with a low charged capacity for a long time in the case where the battery 126 is charged in stages from the initial value to the preparatorily charged capacity. In other words, it is possible to prolong a time period in which the battery 126 is maintained with a charged capacity that is the preparatorily charged capacity (predetermined threshold T) or less. Accordingly, it is possible to more effectively prevent the battery 126 from deteriorating.

<2-5, Cancellation of Charging Suppression Control>

The example of the charging suppression control in which the battery 126 is charged in stages to the preparatorily charged capacity has been described above. Next, a method for canceling the charging suppression control according to the present disclosure will be described. As described above, under the charging suppression control according to the present disclosure, charging of the battery 126 is temporarily stopped at the preparatorily charged capacity before the predicted discharge starting time. The preparatorily charged capacity is less than the fully charged capacity. However, it is considered that the user changes his/her schedule suddenly and the user starts using the mobile phone 100 before the discharge starting time predicted by the prediction unit 116. At this time, it is preferable for the user to cancel the charging suppression control and immediately charge the battery 126 from the preparatorily charged capacity to the fully charged capacity.

Figure 13:
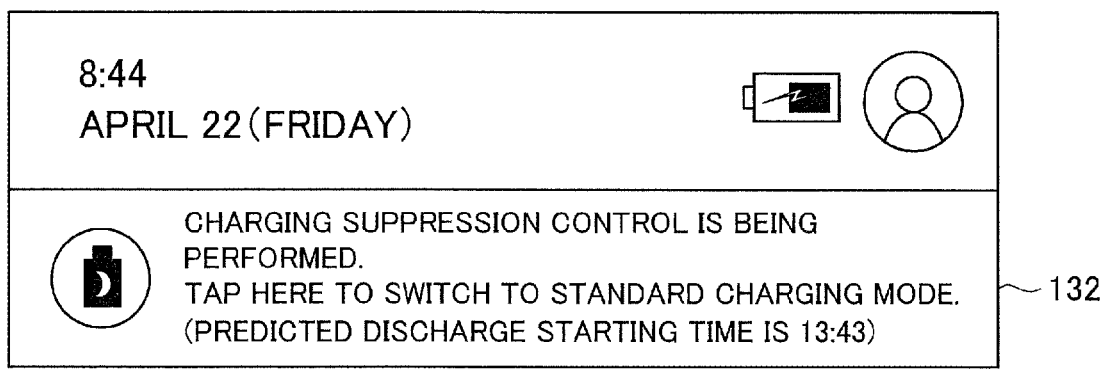
FIG. 13 is a diagram illustrating an example of a display screen displayed by the information processing device according to the embodiment of the present disclosure.

FIG. 13 is a diagram illustrating an example of a display screen used for canceling the above-described charging suppression control according to the present disclosure. Here, an area 132 includes a display similar to the charging mode display icon 130 described with reference to FIG. 11, and includes a display of a message indicating that the charging suppression control is being performed. In addition, the area 132 includes a display of the specified discharge staring time. By tapping the area 132, the user is capable of canceling the charging suppression control and charging the battery 126 in the standard charging mode.

Figure 14:
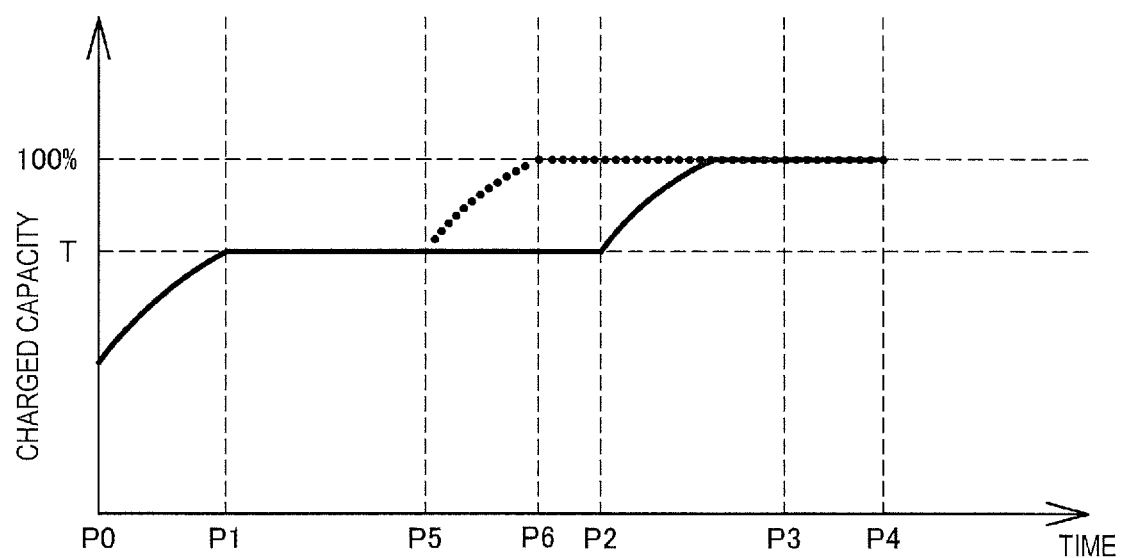
FIG. 14 is a diagram illustrating an example of a process performed when charging suppression control performed by the information processing device according to the embodiment of the present disclosure is canceled.

FIG. 14 is a diagram illustrating charging control performed in the case where the charging suppression control according to the present disclosure is canceled. FIG. 14 illustrates an example in which the user cancels the charging suppression control at a time point P5. Note that, in FIG. 14, a solid line represents control performed in the case where the charging suppression control is continuously performed, and a dotted line represents control performed in the case where the charging suppression control is canceled.

As described above, under the charging suppression control according to the present disclosure, charging is temporarily stopped at the time point P1 when the battery 126 is charged to the preparatorily charged capacity. Next, the charged capacity of the battery 126 is maintained at the preparatorily charged capacity until the time point P5, and the charging suppression control is canceled at the time point 135. When the charging suppression control is canceled, charging restarts at the time point of the cancellation (time point P5), and the battery 126 is fully charged at a time point P6. According to the above-described configuration of the mobile phone 100, it is possible for the user to easily cancel the charging suppression control and handle the sudden change in schedules.

In addition, in the case where the mobile phone 100 includes a movement sensor that detects movement of the mobile phone 100 such as an acceleration sensor or a gyro sensor, it is possible for the user to cancel the charging suppression control by shaking the mobile phone 100 with a predetermined acceleration or more. According to the above-described configuration of the mobile phone 100, it is possible for the user to cancel the charging suppression control more quickly without operating a display content displayed on the display unit 102. This is very convenient for a user who has to handle sudden change in his/her schedule.

In addition, the display unit 102 may display a display (such as a message) notifying a user that the charging suppression control has been canceled. In addition, when the charging suppression control is canceled, it is also possible for the light emitting unit 106 to emit light in a different color to notify the user that the charging suppression control has been canceled, as described above. In addition, it is also possible to notify the user by voice that the charging suppression control has been canceled.

<2-6. Process Example in Case where Charger is Disconnected>

The example in which the charging suppression control according to the present disclosure is canceled through the user operation has been described above. Next, a process performed under the charging suppression control according to the present disclosure in the case where a charger is disconnected from the charging terminal 104 of the mobile phone 100 before the battery 126 is fully charged, will be described.

Hereinafter, the user may intentionally disconnect a charger from the mobile phone 100, or may accidentally disconnect the charger from the mobile phone 100. For example, in the case where the user intentionally disconnects the charger from the mobile phone 100, it is considered that the user activates an application in the mobile phone 100 to check a message from another person during charging. In addition, in the case where the user accidentally disconnects the charger from the mobile phone 100, it is considered that the user accidentally drops the mobile phone 100 and the charger is disconnected from the mobile phone 100.

Figure 15:
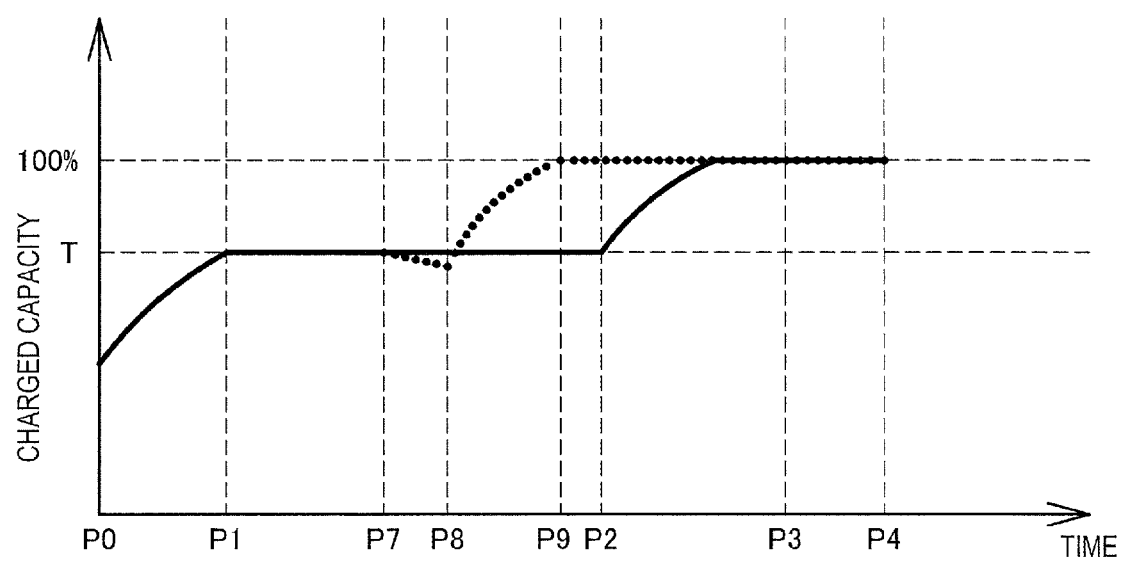
FIG. 15 is a diagram illustrating another example of charging suppression control performed by the information processing device according to the embodiment of the present disclosure.

FIG. 15 illustrates an example in which a charger is disconnected from the charging terminal 104 of the mobile phone 100 at a time point P7. Note that, in FIG. 15, a dotted line represents control performed in the case where the charger is disconnected from the charging terminal 104 of the mobile phone 100 before the battery 126 is fully charged under the charging suppression control, and a solid line represents control performed in the case where the charger is not disconnected.

As represented by the dotted line in FIG. 15, when the charger is disconnected from the mobile phone 100 at the time point P7, the battery 126 starts discharging. Therefore, the charged capacity of the battery 126 decreases. Next, when the charger is reconnected to the charging terminal 104 of the mobile phone 100 at a time point P8, the battery 126 is charged under the standard charging control in which the charging suppression control is not performed. Therefore, charging of the battery 126 restarts at the time point P8, and the battery 126 is fully charged at a time point P9. According to such a configuration of the mobile phone 100, it is possible to certainly charge the battery to the fully charged capacity in the case where the charger is temporarily disconnected.

Note that, the example in which the standard charging is carried out when the charger is reconnected to the mobile phone 100 at P8 has been described above. However, it is also possible to configure the charging control unit 120 such that the charging suppression control is performed again in the case where an interval between the time point (P7) at which the charger is disconnected from the mobile phone 100 and the time point (P8) at which the charger is reconnected to the mobile phone 100 is shorter than a predetermined time period. According to such a configuration of the mobile phone 100, it is possible to perform the charging suppression control even in the case where the charger is temporarily disconnected, for example.

In this case, the battery 126 is charged from the time point P8 in FIG. 15 until the charged capacity of the battery 126 becomes the preparatorily charged capacity (threshold T). Subsequently, the charging is stopped until the time point P2 that is a predetermined period of time before the discharge starting time that is initially specified by the time specification unit 118. In addition, the prediction unit 116 may predict a chargeable time period again at the time point P8 at which the charger is reconnected to the mobile phone 100, and the charging control unit 120 may perform the charging suppression control again on the basis of the predicted chargeable time period.

<2-7. Charging Suppression Control Using Accuracy>

The process performed under the charging suppression control according to the present disclosure in the case where a charger is disconnected from the charging terminal 104 of the mobile phone 100 before the battery 126 is fully charged has been described above. Next, charging suppression control using accuracy will be described. The accuracy is calculated by comparing the discharge starting time specified by the time specification unit 118 with a time when the user has actually disconnected the charger from the mobile phone 100, for example. The charging control unit 120 determines whether or not to perform the charging suppression control by using the accuracy of the discharge starting time specified by the time specification unit 118.

Specifically, the prediction unit 116 determines whether or not there is an interval of a predetermined time period or more (such as 30 minutes or more) between the discharge staring time specified by the time specification unit 118 and the time when the user has actually disconnected the charger from the mobile phone 100. Here, it is determined that the chargeable time period has been erroneously predicted in the case where there is an interval of the predetermined time period or more between the specified discharge staring time and the time when the user has actually disconnected the charger from the mobile phone 100. In addition, it is determined that the predicted chargeable time period is correct in the case where the interval between the specified discharge staring time and the time when the user has actually disconnected the charger from the mobile phone 100 is a predetermined time period or less. The prediction unit 116 may draw comparisons between the above-described times for a week. Subsequently, the charging control unit 120 performs charging suppression control in the case where an accuracy rate of the comparisons is a predetermined value or more (such as 80% or more).

Figure 16:
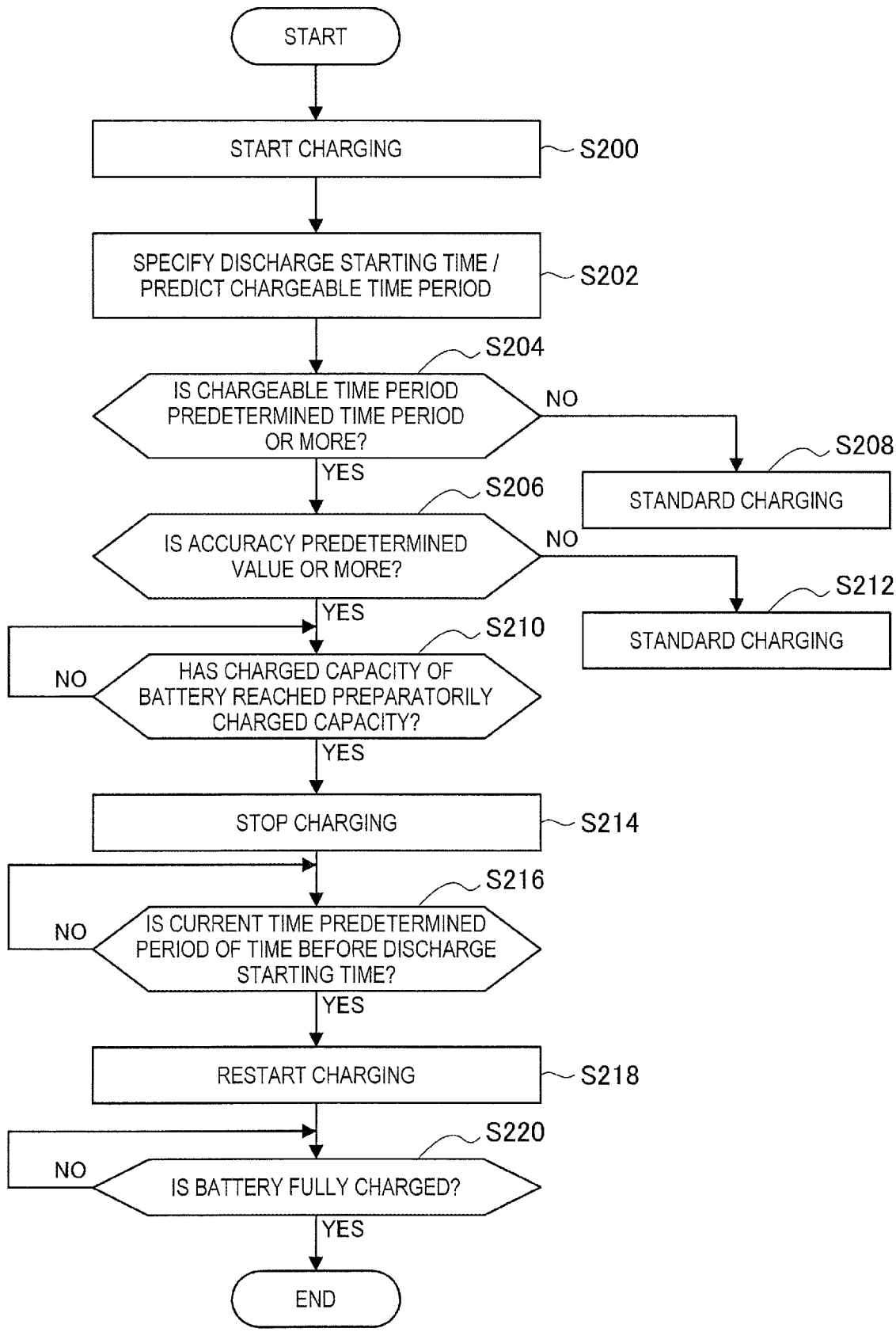
FIG. 16 is a flowchart illustrating another example of a charging suppression control process performed by the information processing device according to the embodiment of the present disclosure.

FIG. 16 is a flowchart illustrating operation under the charging suppression control using the accuracy. Step S200 to Step S204 correspond to Step S100 to Step S104 in FIG. 10. In Step S206, the charging control unit 120 receives accuracy from the prediction unit 116 and determines whether or not the accuracy is a predetermined value or more. Next, in the case where the accuracy is the predetermined value or more, the process proceeds to Step S210, and the charging control unit 120 performs the charging suppression control according to the present disclosure. On the other hand, when it is determined that the accuracy is less than the predetermined value in Step S206, the process proceeds to Step S212 and the charging control unit 120 carries out the standard charging. As described above, according to such a configuration of the information processing device, it is possible to perform the charging suppression control in the case where a chargeable time period is predicted with certain accuracy.

3. Charging Suppression Control Using Information from Application

The process of charging suppression control using accuracy has been described above. Next, a process of charging suppression control using information from an application will be described.

The applications executed by the mobile phone 100 include an application in which times or schedules are set. Examples of the application in which times are set include an application having an alarm clock function and an application having a calendar function for inputting schedules of a user.

Here, a time set by the alarm clock function is deemed to be a time when the user will start using the mobile phone 100. In other words, the time set by the alarm clock function is deemed to be a time when the mobile phone 100 is disconnected from the charger and the battery 126 starts discharge. In addition, in the case where a specific schedule such as "going out" or "coming home" is set in the calendar function, a starting time of the specific schedule is also deemed to be the time when the mobile phone 100 is disconnected from the charger and the battery 126 starts discharge.

Therefore, the time specification unit 118 may specify the time set by the alarm clock function or the time when the specific schedule is to be executed as a discharge starting time for performing the charging suppression control according to the present disclosure. The chargeable time period specified on the basis of the time set by the alarm clock function and the time when the specific schedule is to be executed is prioritized over a discharge starting time based on a chargeable time period predicted by the prediction unit 116.

Figure 17:
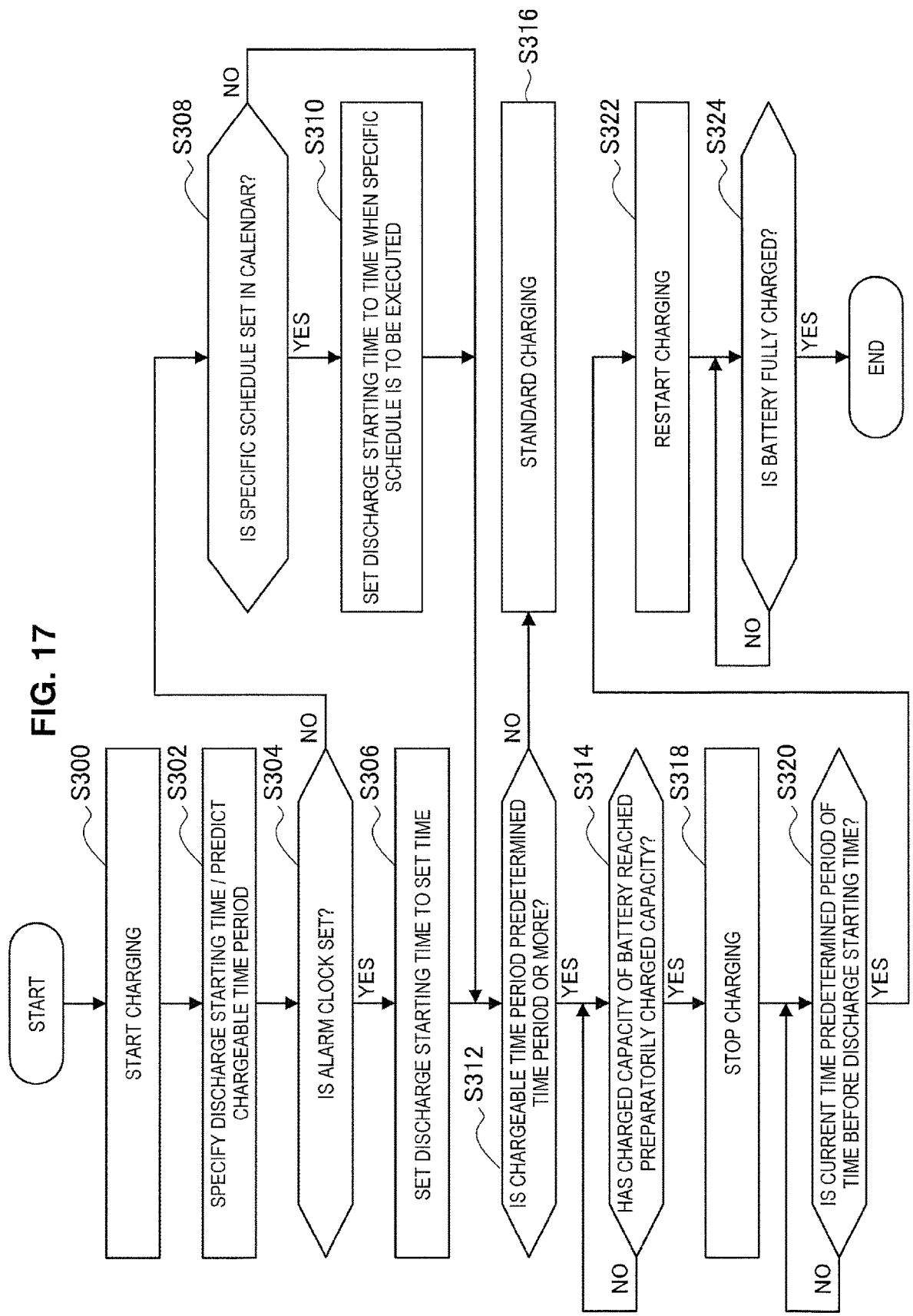
FIG. 17 is a flowchart illustrating another example of a charging suppression control process performed by the information processing device according to the embodiment of the present disclosure.

FIG. 17 is a flowchart illustrating a process of the charging suppression control using information from an application. First, in Step S300, charging starts when a charger is connected to the charging terminal 104 of the mobile phone 100. Next, in Step S302, the prediction unit 116 predicts a chargeable time period. In addition, the time specification unit 118 receives the chargeable time period predicted by the prediction unit 116 and specifies a discharge starting time.

Next, in Step S304, the time specification unit 118 determines whether or not a time for executing the alarm clock function is set by the application having the alarm clock function. When the time specification unit 118 determines that the time is set by the application having the alarm clock function in Step S304, the process proceeds to Step S306. Next, in Step S306, the time specification unit 118 specifies the time set for executing the alarm clock function, as a discharge starting time. Here, in Step S312, the charging control unit 120 determines whether or not the chargeable time period is a predetermined time period or longer, on the basis of the discharge starting time specified in Step S306 by using the information from the application having the alarm clock function.

When the time specification unit 118 determines that no schedule is set by the application having the alarm clock function in Step S304, the process proceeds to Step S308. In step S308, the time specification unit 118 determines whether or not a specific schedule is set by an application having a calendar function. When the time specification unit 118 determines that a specific schedule is set by the application having the calendar function in Step S308, the process proceeds to Step S310. Next, in Step S310, the time specification unit 118 specifies the starting time of the set specific schedule as a discharge starting time. Here, in Step S312, the charging control unit 120 determines whether or not the chargeable time period is a predetermined time period or longer, on the basis of the discharge starting time specified in Step S310 by using the information from the application having the calendar function.

Figure 10:
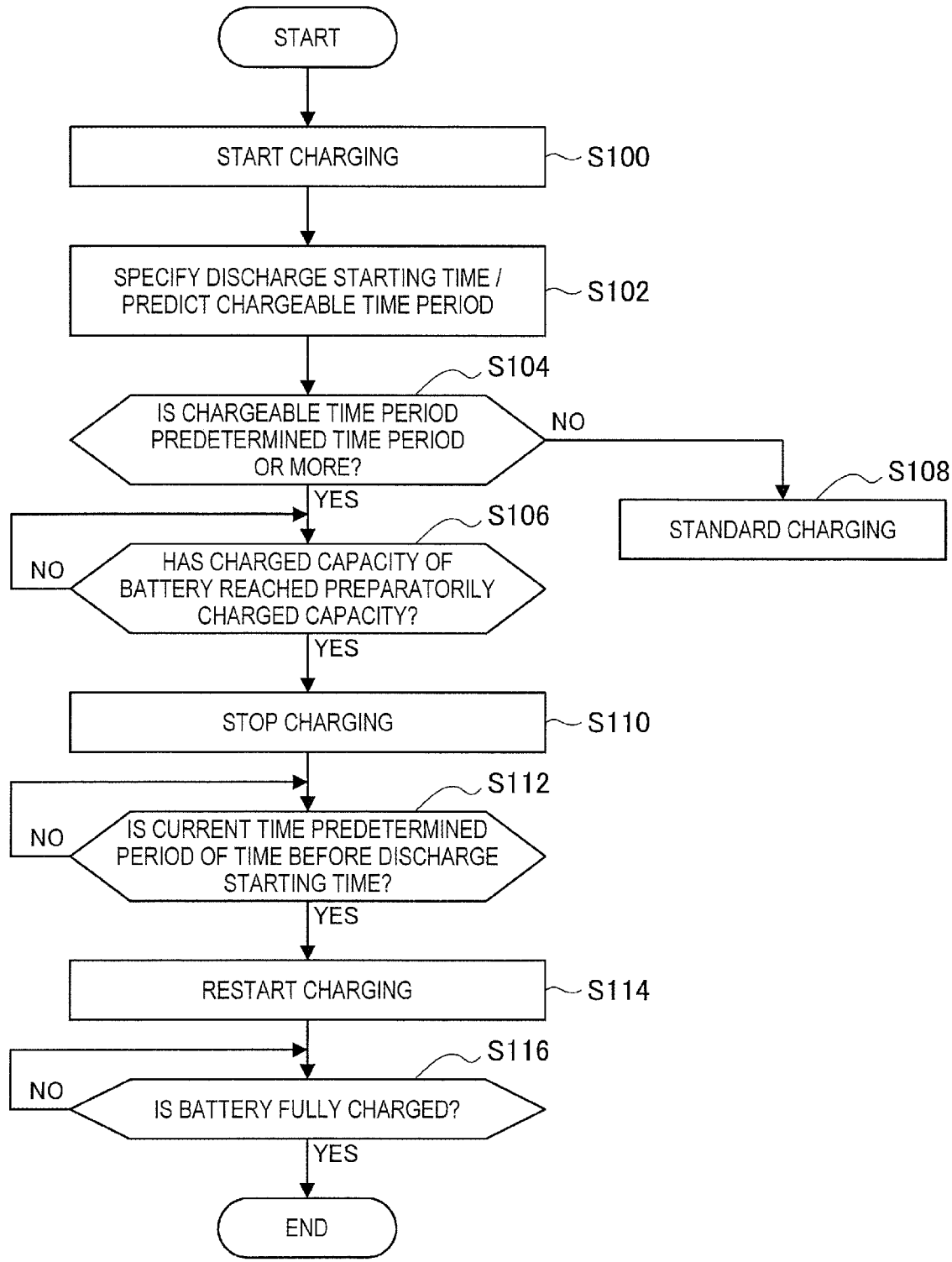
FIG. 10 is a flowchart illustrating an example of a charging suppression control process performed by the information processing device according to the embodiment of the present disclosure.

When the time specification unit 118 determines that no specific schedule is set by the application having the calendar function in Step S308, the process proceeds to S312. At this time, the charging control unit 120 determines whether a chargeable time period is a predetermined time period or longer, on the basis of the chargeable time period predicted by the prediction unit 116 in Step S302. Subsequently, processes similar to the charging suppression control described with reference to FIG. 10 are performed.

As described above, in the case where a specific time or schedule is set in an application, the time set in the application may be prioritized over a discharge starting time based on the chargeable time period predicted by the prediction unit 116, and it is possible to use the time set in the application as a discharge starting time. Accordingly, it is possible to perform the charging suppression control according to the present disclosure on the basis of a time or schedule set by the user, the time and schedule being considered to have higher reliabilities.

4. Charging Suppression Control Based on Information from Another Information Processing Device The charging suppression control based on information from an application in which a specific time or schedule is set has been described above. Next, charging suppression control based on information from another information processing device will be described.

Figure 18:
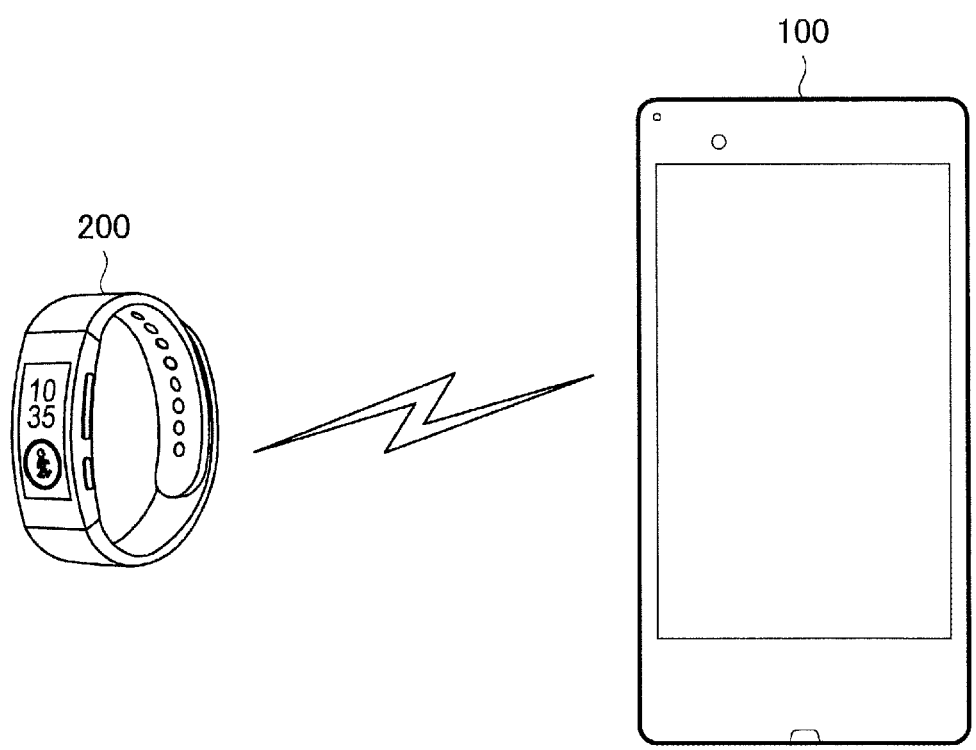
FIG. 18 is a diagram illustrating an example in which the information processing apparatus and another information processing device according to the embodiment of the present disclosure are wirelessly connected.

FIG. 18 is a diagram illustrating a wristband-type small terminal 200 that is connected to the mobile phone 100 through short-range wireless communication. The small terminal 200 is connected to the mobile phone 100 by using a short-range wireless communication interface such as Bluetooth (registered trademark). In addition, the small terminal 200 includes a sensor that detects movement of a user who is wearing the small terminal 200. The sensor that detects movement of the user may be an acceleration sensor or a gyro sensor, for example.

Figure 19:
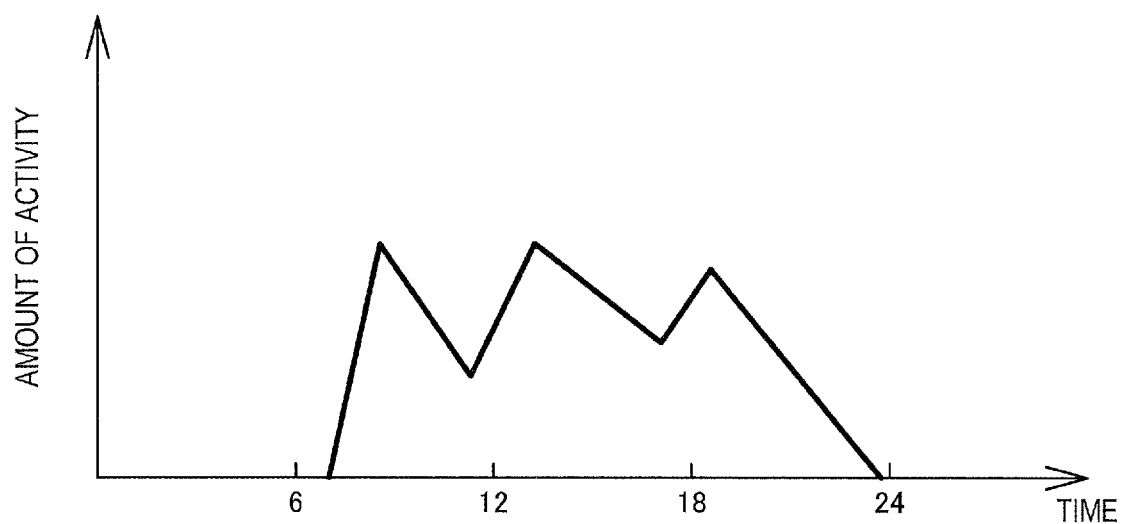
FIG. 19 is a diagram illustrating an example of an amount of activity of a user calculated by the other information processing device according to the embodiment of the present disclosure.

In addition, the small terminal 200 is capable of calculating an amount of activity of the user on the basis of information from the above-described sensor that detects movement of the user. FIG. 19 is a diagram illustrating an example of the amount of activity of the user calculated by the small terminal 200. In the example illustrated in FIG. 19, the amount of activity of the user increases around 7 o'clock, 12 o'clock, and 18 o'clock.

With reference to the example illustrated in FIG. 19, it is considered that the amount of activity has increased around 7 o'clock because the user has woken up, for example. In addition, it is considered that the amount of activity has increased around 12 o'clock because the user has gone out to lunch. In addition, it is considered that the amount of activity has increased around 18 o'clock because the user has gotten back home. Such behavior of the user like wake-up, going out, and coming home is behavior that is closely related to the user's behavior of disconnecting the mobile phone 100 from the charger.

Therefore, the prediction unit 116 may learn a chargeable time period by using a time when a large amount of activity of the user is calculated by the small terminal 200 instead of a time when the battery 126 will start discharge. At this time, the mobile phone 100 stores the calculated amount of activity. Subsequently, the prediction unit 116 learns the chargeable time period while using the time when the large amount of activity is obtained as the a time when the battery 126 will start discharge. In addition, in a way similar to the above-described examples, it is possible for the prediction unit 116 to learn a chargeable time period by using data of amounts of activities for one or more weeks.

As described above, according to such a configuration of the mobile phone 100, it is possible to perform the charging suppression control on the basis of behavior of a user. Therefore, it is possible to suppress overcharging and it is possible to fully charge battery 126 when the user is expected to perform behavior of disconnecting the charger from the mobile phone 100.

5. Supplement

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a chargeable time period may be predicted at a time point (P0 in FIG. 4) at which the charging terminal 104 of the mobile phone 100 is connected to a charger, and may be predicted again at a time point (P1 in FIG. 4) at which the battery 126 is charged to the preparatorily charged capacity. In other words, it is possible for the prediction unit 116 to predict a chargeable time period more than once. Accordingly, the charging suppression control is performed in the case where a user starts charging at a time (such as 5 o'clock in FIG. 6) when it is initially determined that a chargeable time period is short, and the charging continues until a time (such as 10 o'clock in FIG. 6) when it is determined that the chargeable time period is a predetermined time period or more, for example.

In addition, in the above-described example, the prediction unit 116 predicts the chargeable time period by using data related to chargeable time periods stored in the storage unit 114. However, it is also possible for the prediction unit 116 to predict a discharge staring time instead of a chargeable time period, and predict the chargeable time period by comparing the predicted discharge staring time with a time when the charger is connected to the charging terminal 104 of the mobile phone 100. In addition, at this time, the time specification unit 118 may specify a discharge starting time by using the discharge starting time predicted by the prediction unit 116.

In addition, the example of using the application having the alarm clock function and the application having the calendar function has been described with reference to FIG. 17. However, the application in which times or schedules are set is not limited thereto. In addition, in the above-described example, the application having the alarm clock function is prioritized over the application having the calendar function when specifying the discharge starting time. However, priority levels of the applications to be used are not limited thereto.

In addition, in the case where there are a plurality of applications in which times are set, it is possible for a user to set priority levels of the applications to be used for specifying a discharge starting time. At this time, the mobile phone 100 may be configured to display a setting screen for setting the priority levels of the applications.

In addition, it may be possible to provide a computer program for causing the prediction unit 116 and the charging control unit 120 to operate as described above. Moreover, it may be possible to provide a storage medium having the computer program stored therein.

6. Conclusion

As described above, the information processing device according to the present disclosure performs the charging suppression control such that charging of the battery 126 stops at the preparatorily charged capacity and the charging restarts on the basis of the specified discharge staring time. Accordingly, it is possible to shorten a time period in which the battery 126 is maintained in the overcharged state, and it is possible to obtain the battery 126 with the fully charged capacity when the user wants to use the information processing device. Therefore, it is possible to provide the charging method that is convenient for users.

In addition, the information processing device according to the embodiment of the present disclosure specifies a discharge starting time on the basis of information from an application in which a time is set. Accordingly, it is possible to perform the charging suppression control according to the present disclosure on the basis of a time set by the user, the time being considered to have higher reliabilities.

In addition, the information processing device according to the embodiment of the present disclosure specifies a discharge starting time on the basis of an amount of activity of a user obtained from information from another information processing device. Therefore, it is possible to perform the charging suppression control based on behavior of the user.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a charged capacity detection unit configured to detect a charged capacity of a battery;

a charging control unit configured to control a charging circuit; and a specification unit configured to specify when discharge of the battery starts, in which the charging control unit performs charging suppression control on the charging circuit such that the battery is charged to a preparatorily charged capacity that is lower than a fully charged capacity of the battery, on the basis of the charged capacity detected by the charged capacity detection unit, the charging of the battery stops when the charged capacity of the battery reaches the preparatorily charged capacity, and the charging of the battery restarts from the preparatorily charged capacity before discharge of the battery starts.

(2)

The information processing device according to (1), further including:

a charging terminal configured to connect to a charger for charging the battery; and a prediction unit configured to predict a chargeable time period before discharge of the battery starts, on the basis of charge/discharge time information related to a time when the charger has been connected to the charging terminal and a time when the charger has been disconnected from the charging terminal in past.

(3)

The information processing device according to (2), in which the specification unit specifies the time when charging of the battery is to be started, on the basis of the chargeable time period predicted by the prediction unit.

(4)

The information processing device according to (3), in which the prediction unit derives the chargeable time period on the basis of the charge/discharge time information of one or more weeks.

(5)

The information processing device according to (4), in which the prediction unit derives the chargeable time period on the basis of the charge/discharge time information of a corresponding day of the one or more weeks.

(6)

The information processing device according to (4) or (5), in which the prediction unit derives the chargeable time period by differently weighting pieces of the charge/discharge time information of different weeks among the one or more weeks.

(7)

The information processing device according to any one of (2) to (6), in which the charging control unit performs the charging suppression control in a case where the chargeable time period is a predetermined time period or longer.

(8)

The information processing device according to any one of (2) to (7), in which the specification unit changes a time when charging is to be restarted from the preparatorily charged capacity on the basis of a state of the information processing device.

(9)

The information processing device according to any one of (1) to (8), in which the charging control unit controls the charging circuit such that the battery is charged in stages to the preparatorily charged capacity.

(10)

The information processing device according to (9), in which, when charging the battery to the preparatorily charged capacity, the charging control unit controls the charging circuit such that the battery is charged at a predetermined time interval.

(11)

The information processing device according to (9), in which, when charging the battery to the preparatorily charged capacity, the charging control unit controls the charging circuit such that the battery is charged by a predetermined charged capacity.

(12)

The information processing device according to any one of (1) to (11), further including:

a display unit; and a processing unit configured to generate information to be displayed on the display unit, in which the processing unit causes the display unit to display a display indicating that the charging suppression control is being performed.

(13)

The information processing device according to any one of (1) to (12), further including a processing unit configured to execute an application, in which the specification unit specifies a time when discharge of the battery is to be started, on the basis of information from the application.

(14)

The information processing device according to (13), in which the application is an application including an alarm clock function, and the specification unit specifies a time when the alarm clock function is to be executed, as the time when discharge of the battery is to be started.

(15)

The information processing device according to (13), in which the application is an application including a calendar function, and in a case where a specific schedule is set in the application including the calendar function, the specification unit specifies a time when the specific schedule is to be executed, as the time when discharge of the battery is to be started.

(16)

The information processing device according to (1), including a prediction unit configured to predict a chargeable time period on the basis of information from another information processing device.

(17)

The information processing device according to (16), in which the information from the other information processing device is information based on a sensor included in the other information processing device, the sensor detecting movement of the other information processing device.

(18)

An information processing system including:

a charged capacity detection unit configured to detect a charged capacity of a battery;

a charging control unit configured to control a charging circuit; and a time specification unit configured to specify when discharge of the battery starts, in which the charging control unit performs charging suppression control on the charging circuit such that the battery is charged to a preparatorily charged capacity that is lower than a fully charged capacity of the battery, on the basis of the charged capacity detected by the charged capacity detection unit, the charging of the battery stops when the charged capacity of the battery reaches the preparatorily charged capacity, and the charging of the battery restarts from the preparatorily charged capacity before discharge of the battery starts.

(19)

A charging method including:

detecting a charged capacity of a battery;

specifying when discharge of the battery starts;

charging the battery to a preparatorily charged capacity that is lower than a fully charged capacity of the battery, on the basis of the detected charged capacity of the battery;

stopping the charging of the battery when the charged capacity of the battery reaches the preparatorily charged capacity; and performing charging suppression control on a charging circuit such that the charging of the battery restarts from the preparatorily charged capacity before discharge of the battery starts.

REFERENCE SIGNS LIST

100 mobile phone
102 display unit
104 charging terminal
106 light emitting unit
108 touchscreen
110 cellular communication unit
112 processing unit
114 storage unit
116 prediction unit
118 time specification unit
120 charging control unit
122 charging circuit
124 charged capacity detection unit
126 battery
128 status bar
130 charging mode display icon
200 small terminal

The invention claimed is:

1. An information processing device comprising:
   circuitry configured to:
   detect a charged capacity of a battery;
   control charging of the battery;
   specify when discharge of the battery starts; and
   perform charging suppression control by charging the battery to a preparatorily charged capacity that is lower than a fully charged capacity of the battery, on a basis of the charged capacity detected,
   stopping the charging when the charged capacity of the battery reaches the preparatorily charged capacity,
   setting a margin based on current conditions, and
   restarting, at a time obtained by subtracting the margin and a time to fully charge the battery from the preparatorily charge capacity,
   the charging of the battery from the preparatorily charged capacity before starting discharge of the battery; and
   a charging terminal configured to connect to a charger for charging the battery,
   wherein the circuitry is further configured to predict a chargeable time period before discharge of the battery starts, on a basis of charge/discharge time information related to a time when the charger has been connected to the charging terminal and a time when the charger has been disconnected from the charging terminal in past,
      derive the chargeable time period on a basis of the charge/discharge time information of one or more weeks,
      perform comparisons between the specified time when discharge of the battery starts and the times when the charger has been disconnected from the charging terminal in the past, and
      determine, for times when the charger has been connected to the charting terminal and times when the charger has been disconnected from the charging terminal in the past,
      if there is an interval of time less than or equal to a predetermined time period between the specified time when discharge of the battery starts and the times when the charger has been disconnected from the charging terminal,
      perform the charging suppression control on condition that an accuracy rate of the comparison performed is a predetermined value or more.

2. The information processing device according to claim 1,
   wherein the circuitry is further configured to derive the chargeable time period on a basis of the charge/discharge time information of one or more weeks.

3. The information processing device according to claim 2,
   wherein the circuitry is further configured to derive the chargeable time period on a basis of the charge/discharge time information of a corresponding day of the one or more weeks.

4. The information processing device according to claim 2,
   wherein the circuitry is further configured to derive the chargeable time period by differently weighting pieces of the charge/discharge time information of different weeks among the one or more weeks.

5. The information processing device according to claim 1,
wherein the circuitry is further configured to perform the charging suppression control on condition that the chargeable time period is a predetermined time period or longer.

6. The information processing device according to claim 1,
wherein the circuitry is further configured to change a time when charging is to be restarted from the preparatorily charged capacity on a basis of a state of the information processing device.

7. The information processing device according to claim 1,
wherein the circuitry is further configured to control the charging such that the battery is charged in stages to the preparatorily charged capacity.

8. The information processing device according to claim 7,
wherein, when charging the battery to the preparatorily charged capacity, the circuitry is further configured to charge the battery for a predetermined time interval.

9. The information processing device according to claim 7,
wherein, when charging the battery to the preparatorily charged capacity, the circuitry is configured to charge the battery by a predetermined charged capacity.

10. The information processing device according to claim 1, further comprising:
a display,
wherein the circuitry causes the display to an indication that the charging suppression control is being performed.

11. The information processing device according to claim 1, wherein
the circuitry is configured to
execute an application,
specify a time when discharge of the battery is to be started, on a basis of information from the application.

12. The information processing device according to claim 11, wherein
the application is an application including an alarm clock function, and
the circuitry is configured to specify a time when the alarm clock function is to be executed, as the time when discharge of the battery is to be started.

13. The information processing device according to claim 11, wherein
the application is an application including a calendar function, and
in a case where a specific schedule is set in the application including the calendar function, the circuitry is configured to specify a time when the specific schedule is to be executed, as the time when discharge of the battery is to be started.

14. The information processing device according to claim 1, wherein
the circuitry configured to predict a chargeable time period on a basis of information from another information processing device.

15. The information processing device according to claim 14,
wherein the information from the other information processing device is information based on a sensor included in the other information processing device, the sensor detecting movement of the other information processing device.

16. An information processing system comprising:
circuitry configured to:
detect a charged capacity of a battery;
control a charging circuit; and
specify when discharge of the battery starts,
perform charging suppression control by charging the battery to a preparatorily charged capacity that is lower than a fully charged capacity of the battery, on a basis of the charged capacity detected,
stopping the charging of the battery when the charged capacity of the battery reaches the preparatorily charged capacity,
setting a margin based on current conditions,
restarting, at a time obtained by subtracting a margin and a time to fully charge the battery from the preparatorily charge capacity,
the charging of the battery from the preparatorily charged capacity before starting discharge of the battery,
predicting a chargeable time period before discharge of the battery starts, on a basis of charge/discharge time information related to a time when a charger has been connected to a charging terminal of the battery and a time when the charger has been disconnected from the charging terminal in past,
deriving the chargeable time period on a basis of the charge/discharge time information of one or more weeks,
perform comparisons between the specified time when discharge of the battery starts and the times when the charger has been disconnected from the charging terminal in the past, and
determining, for times when the charger has been connected to the charging terminal and times when the charger has been disconnected from the charging terminal in the past,
if there is an interval of time less than or equal to a predetermined time period between the specified time when discharge of the battery starts and the times when the charger has been disconnected from the charging terminal,
performing the charging suppression control on condition that an accuracy rate of the comparison performed is a predetermined value or more.

17. A charging method comprising: detecting a charged capacity of a battery;
specifying when discharge of the battery starts;
charging the battery to a preparatorily charged capacity that is lower than a fully charged capacity of the battery, on a basis of the detected charged capacity of the battery;
stopping the charging of the battery when the charged capacity of the battery reaches the preparatorily charged capacity;
setting a margin based on current conditions;
performing charging suppression control by restarting, at a time obtained by subtracting the margin and a time to fully charge the battery from the preparatorily charge capacity,
charging of the battery from the preparatorily charged capacity before discharge of the battery starts;
predicting a chargeable time period before discharge of the battery starts, on a basis of charge/discharge time information related to a time when a charger has been connected to a charging terminal of the battery and a time when the charger has been disconnected from the charging terminal in past;

deriving the chargeable time period on a basis of the charge/discharge time information of one or more weeks;
perform comparisons between the specified time when discharge of the battery starts and the times when the charger has been disconnected from the charging terminal in the past, and
determining, for times when the charger has been connected to the charging terminal and times when the charger has been disconnected from the charging terminal in the past,
if there is an interval of time less than or equal to a predetermined time period between the specified time when discharge of the battery starts and the times when the charger has been disconnected from the charging terminal,
performing the charging suppression control on condition that an accuracy rate of the comparison performed is a predetermined value or more.

* * * * *